United States Patent
Park et al.

(10) Patent No.: US 12,111,864 B2
(45) Date of Patent: Oct. 8, 2024

(54) ELECTRONIC DEVICE AND CONTROL METHOD THEREFOR

(71) Applicant: SAMSUNG ELECTRONICS CO., LTD., Suwon-si (KR)

(72) Inventors: Jungho Park, Suwon-si (KR); Yunsu Lee, Suwon-si (KR); Jaehun Lee, Suwon-si (KR); Mirae Jeong, Suwon-si (KR); Jiyoung Kang, Suwon-si (KR); Sejin Kwak, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 346 days.

(21) Appl. No.: 17/414,802

(22) PCT Filed: Dec. 24, 2019

(86) PCT No.: PCT/KR2019/018421
§ 371 (c)(1),
(2) Date: Jun. 16, 2021

(87) PCT Pub. No.: WO2020/149546
PCT Pub. Date: Jul. 23, 2020

(65) Prior Publication Data
US 2022/0019615 A1 Jan. 20, 2022

(30) Foreign Application Priority Data
Jan. 18, 2019 (KR) .................. 10-2019-0006878

(51) Int. Cl.
*G06F 16/00* (2019.01)
*G06F 16/532* (2019.01)
(Continued)

(52) U.S. Cl.
CPC ........ *G06F 16/532* (2019.01); *G06F 16/5846* (2019.01); *G06F 16/5854* (2019.01);
(Continued)

(58) Field of Classification Search
CPC ............. G06F 16/532; G06F 16/90332; G06F 16/5854; G06F 16/26; G06F 40/106;
(Continued)

(56) References Cited

U.S. PATENT DOCUMENTS 7,627,098 B2 12/2009 Baik et al.
9,195,960 B2 11/2015 Kim
(Continued)

FOREIGN PATENT DOCUMENTS

EP 3293691 A1 * 3/2018
EP 3340159 A1 6/2018
(Continued)

OTHER PUBLICATIONS

Z. Luo et al., "A probabilistic reasoning system based on a causal graph approach", IEE Colloquium on Knowledge Engineering, May 1990 pp.*

(Continued)

*Primary Examiner* — Srirama Channavajjala
(74) *Attorney, Agent, or Firm* — Sughrue Mion, PLLC

(57) ABSTRACT

An electronic device is disclosed. The electronic device comprises: a memory including at least one command; and a processor connected to the memory to control the electronic device, wherein by executing the at least one command, the processor obtains an image according to a user's interaction with the electronic device, obtains information about the user's intention according to information about an object obtained from the image and context information obtained during the interaction, and obtains information concerning the obtained object from a knowledge base stored in the memory, according to the information about the user's intention, wherein the knowledge base includes device information about a plurality of electronic devices used during the user's activity, object information about a (Continued)

| | 311 | 312 | 313 | 314 | 315 | |
|---|---|---|---|---|---|---|
| | TV | Car | REFRIGERATOR | MOBILE PHONE | GLASSES | .... |
| 321 | Shopping | X | 0 | 0 | 0 | 0 |
| 322 | Food | X | 0 | X | 0 | 0 |
| 323 | Cooking | X | X | 0 | 0 | 0 |
| 324 | TV | 0 | X | X | 0 | 0 |
| | .... | | | | | |

| | 411 | 412 | 413 | 414 | 415 | 416 | |
|---|---|---|---|---|---|---|---|
| | EGGS | FRIED EGG | RESTAURANT NAME A | TV PROGRAM XXX | TV PROGRAM YYY | POTATOES | .... |
| 421 | Shopping | 0 | X | X | X | X | 0 |
| 422 | Food | X | 0 | 0 | X | 0 | X |
| 423 | Cooking | 0 | 0 | X | 0 | X | 0 |
| 424 | TV | X | X | X | 0 | 0 | X |
| | .... | | | | | | | plurality of objects obtained according to the activity, and intention information corresponding to correlative information, and the processor obtains, from the knowledge base, information concerning the obtained object according to the intention information corresponding to the obtained object.

14 Claims, 26 Drawing Sheets

(51) Int. Cl.
| | |
|---|---|
| G06F 16/583 | (2019.01) |
| G06F 16/9032 | (2019.01) |
| G06F 16/951 | (2019.01) |
| G06F 16/9537 | (2019.01) |
| G06N 3/042 | (2023.01) |
| G06N 3/045 | (2023.01) |
| G06N 5/022 | (2023.01) |
| G06N 20/00 | (2019.01) |
| G06V 20/20 | (2022.01) |
| H04L 67/50 | (2022.01) |
| G06Q 30/0601 | (2023.01) |

(52) U.S. Cl.
CPC ...... *G06F 16/90332* (2019.01); *G06F 16/951* (2019.01); *G06F 16/9537* (2019.01); *G06N 3/042* (2023.01); *G06N 3/045* (2023.01); *G06N 5/022* (2013.01); *G06V 20/20* (2022.01); *H04L 67/535* (2022.05); *G06Q 30/0625* (2013.01)

(58) Field of Classification Search
CPC .............. G06F 16/5846; G06F 16/183; G06F 16/90335; G06F 16/951; G06F 16/9537; G06V 20/20; G06Q 30/0625; G06Q 10/02; H04L 67/535; G06N 3/045; G06N 20/00; G06N 3/042; G06N 5/022
See application file for complete search history.

(56) References Cited

U.S. PATENT DOCUMENTS

| | | | |
|---|---|---|---|
| 9,213,405 B2 | 12/2015 | Perez et al. | |
| 9,330,313 B2 | 5/2016 | Jung et al. | |
| 9,565,562 B1* | 2/2017 | Bar-Menachem | ......................... H04W 12/065 |
| 10,360,479 B2 | 7/2019 | Kim et al. | |
| 10,558,896 B2 | 2/2020 | Kim et al. | |
| 10,909,428 B2 | 2/2021 | Kim et al. | |
| 10,911,833 B2* | 2/2021 | Chang | .................... G06Q 10/02 |
| 2006/0140205 A1 | 6/2006 | Baik et al. | |
| 2009/0162042 A1* | 6/2009 | Wexler | .................. H04N 23/64 396/49 |
| 2012/0207389 A1* | 8/2012 | Ghatare | .............. G06F 16/5854 382/173 |
| 2012/0314043 A1 | 12/2012 | Jung et al. | |
| 2014/0045433 A1 | 2/2014 | Kim | |
| 2014/0289323 A1* | 9/2014 | Kutaragi | ................. H04L 51/08 709/206 |
| 2014/0298383 A1 | 10/2014 | Jo et al. | |
| 2015/0213371 A1* | 7/2015 | Nitz | ........................ H04L 51/02 706/46 |
| 2016/0110437 A1* | 4/2016 | Patel | ....................... G06F 16/26 707/722 |
| 2016/0378861 A1 | 12/2016 | Eledath et al. | |
| 2017/0091551 A1 | 3/2017 | Zhang et al. | |
| 2017/0124740 A1* | 5/2017 | Campbell | ............. G06F 40/106 |
| 2018/0075490 A1 | 3/2018 | Chintalapoodi et al. | |
| 2018/0184240 A1 | 6/2018 | Yang et al. | |
| 2018/0239820 A1 | 8/2018 | Jeong et al. | |
| 2018/0330204 A1 | 11/2018 | Kim et al. | |
| 2019/0042627 A1* | 2/2019 | Osotio | .................... G06F 16/26 |
| 2019/0197365 A1 | 6/2019 | Kim et al. | |
| 2019/0279050 A1 | 9/2019 | Kim et al. | |
| 2019/0349640 A1 | 11/2019 | Chang et al. | |
| 2020/0007474 A1* | 1/2020 | Zhang | ...................... G09B 7/02 |
| 2020/0065680 A1* | 2/2020 | Cheng | ............... G06F 16/90332 |
| 2020/0066270 A1 | 2/2020 | Lee et al. | |
| 2020/0134397 A1 | 4/2020 | Kim et al. | |
| 2020/0143166 A1 | 5/2020 | Jung et al. | |
| 2020/0210754 A1* | 7/2020 | Lin | ........................ G06N 3/045 |

FOREIGN PATENT DOCUMENTS

| | | | |
|---|---|---|---|
| JP | 2006113787 A | | 4/2006 |
| KR | 10-2006-0063326 A | | 6/2006 |
| KR | 1020110057919 A | | 6/2011 |
| KR | 1020140020669 A | | 2/2014 |
| KR | 1020140072651 A | | 6/2014 |
| KR | 1020170055254 A | | 5/2017 |
| KR | 1020180028939 A | | 3/2018 |
| KR | 1020180074316 A | | 7/2018 |
| KR | 1020180079762 A1 | | 7/2018 |
| KR | 1020180096182 A | | 8/2018 |
| KR | 1020180109499 A | | 10/2018 |
| KR | 1020180121273 A | | 11/2018 |
| WO | WO2011088053 A2 | * | 7/2011 |
| WO | WO2013151808 A1 | * | 10/2013 |
| WO | WO2014100774 A1 | * | 6/2014 |
| WO | 2014205231 A1 | | 12/2014 |
| WO | WO 2015162458 A1 | * | 10/2015 |
| WO | WO2019217679 A1 | * | 11/2019 |

OTHER PUBLICATIONS

Apoorva Kakde et al., "Real time composite user activity modelling using hybrid approach for recognition", Mar. 2015, pp. 1-6.*

Written Opinion (PCT/ISA/237) dated Apr. 17, 2020 issued by the International Searching Authority in International Application No. PCT/KR2019/018421.

International Search Report (PCT/ISA/210) dated Apr. 17, 2020 issued by the International Searching Authority in International Application No. PCT/KR2019/018421.

Communication dated Nov. 15, 2021 issued by the European Patent Office in European Application No. 19910068.6.

Office Action dated Apr. 17, 2024, issued by Korean Patent Office in Korean Patent Application No. 10-2019-0006878.

* cited by examiner

FIG. 3

|     |           | TV (311) | Car (312) | REFRIGERATOR (313) | MOBILE PHONE (314) | GLASSES (315) | ..... |
| --- | --------- | -------- | --------- | ------------------ | ------------------ | ------------- | ----- |
| 321 | Shopping  | X        | O         | O                  | O                  | O             |       |
| 322 | Food      | X        | O         | X                  | O                  | O             |       |
| 323 | Cooking   | X        | X         | O                  | O                  | O             |       |
| 324 | TV        | O        | X         | X                  | O                  | O             |       |
|     | .....     |          |           |                    |                    |               |       |

FIG. 4

|  | EGGS | FRIED EGG | RESTAURANT NAME A | TV PROGRAM XXX | TV PROGRAM YYY | POTATOES | ..... |
|---|---|---|---|---|---|---|---|
| 421 — Shopping | O | X | X | X | X | O | |
| 422 — Food | X | O | O | X | O | X | |
| 423 — Cooking | O | O | X | O | X | O | |
| 424 — TV | X | X | X | O | O | X | |
| ..... | | | | | | | |

ELECTRONIC DEVICE AND CONTROL METHOD THEREFOR

TECHNICAL FIELD

The disclosure relates to an electronic device and a control method therefor, and more particularly to, an electronic device providing information related to an object using a knowledge base and a control method therefor.

BACKGROUND ART

With the development of electronic technologies, users acquire various experiences through various types of electronic devices. For example, users watch programs through a television or access websites through a mobile phone.

In such processes, the user gains various pieces of information and a method for more effectively providing such pieces of information in relation to current experiences of the users has been required.

DISCLOSURE

Technical Problem

The disclosure is made in view of the above problem and an object of the disclosure is to provide an electronic device capable of providing information coinciding with intent information corresponding to an object obtained from an image among pieces of information included in a knowledge base and a method for controlling thereof.

Technical Solution

In accordance with an aspect of the disclosure, there is provided an electronic device including a memory including at least one instruction, and a processor configured to be connected to the memory to control the electronic device, in which the processor, by executing the at least one instruction, is configured to obtain an image based on a user's interaction on the electronic device, obtain intent information of the user based on an object obtained from the image and context information during the interaction, and obtain information related to the obtained object from a knowledge base stored in the memory based on the intent information of the user, the knowledge base includes device information on a plurality of electronic devices on which user's activities are performed, object information on a plurality of objects obtained based on the activities, and intent information corresponding to pieces of information related to each other, and the processor is configured to obtain information related to the obtained object based on the intent information corresponding to the obtained object from the knowledge base.

The knowledge base may include data in which the device information on the plurality of electronic devices on which the user's activities are performed, the object information on the plurality of objects obtained based on the activities, and an edge representing a relationship between pieces of information related to each other among the device information and the object information are stored as a graph, and the edge may include the intent information corresponding to the pieces of information related to each other.

The processor may be configured to, based on a user's activity being performed on the electronic device, obtain intent information corresponding to device information on the electronic device on which the activity is performed and object information on at least one object obtained based on the user's activity, determine common intent information among the intent information corresponding to the device information and the object information, and generate the knowledge base based on the device information, the object information, and the common intent information, and an edge representing a relationship between the device information and the object information and an edge representing a relationship between pieces of the object information may include the common intent information.

The processor may be configured to update the knowledge base based on information newly obtained based on a user's activity on the electronic device.

The electronic device according to an embodiment of the disclosure may further include a communication interface including circuitry, and the processor may be configured to, based on information newly obtained based on the user's activities performed on the plurality of electronic devices being received via the communication interface, update the knowledge base based on the received information.

The electronic device according to an embodiment of the disclosure may further include a communication interface including circuitry, and the processor may be configured to transmit the information included in the knowledge base to the plurality of electronic devices via the communication interface.

The processor may be configured to determine information corresponding to the obtained object from the knowledge base, and obtain information having a relationship corresponding to the intent information of the user among information related to the determined information from the knowledge base as the information related to the obtained object.

The electronic device according to an embodiment of the disclosure may further include a display, and the processor may be configured to display the information related to the obtained object on the display.

The electronic device according to an embodiment of the disclosure may further include a camera, and the processor may be configured to obtain the image through the camera based on the user's interaction.

In accordance with another aspect of the disclosure, there is provided a method for controlling an electronic device, the method including obtaining an image based on a user's interaction on the electronic device, obtaining intent information of the user based on an object obtained from the image and context information during the interaction, and obtaining information related to the obtained object from a pre-stored knowledge base based on the intent information of the user, in which the knowledge base includes device information on a plurality of electronic devices on which user's activities are performed, object information on a plurality of objects obtained based on the activities, and intent information corresponding to pieces of information related to each other, and the obtaining the information related to the obtained object includes obtaining information related to the obtained object based on the intent information corresponding to the obtained object from the knowledge base.

The knowledge base may include data in which the device information on the plurality of electronic devices on which the user's activities are performed, the object information on the plurality of objects obtained based on the activities, and an edge representing a relationship between pieces of information related to each other among the device information and the object information are stored as a graph, and the edge may include the intent information corresponding to the pieces of information related to each other.

The control method according to an embodiment of the disclosure may further include, based on a user's activity being performed on the electronic device, obtaining intent information corresponding to device information on the electronic device on which the activity is performed and object information on at least one object obtained based on the user's activity, determining common intent information among the intent information corresponding to the device information and the object information, and generating the knowledge base based on the device information, the object information, and the common intent information, and an edge representing a relationship between the device information and the object information and an edge representing a relationship between pieces of the object information may include the common intent information.

The control method according to an embodiment of the disclosure may further include updating the knowledge base based on information newly obtained based on a user's activity on the electronic device.

The control method according to an embodiment of the disclosure may further include, based on information newly obtained based on the user's activities performed on the plurality of electronic devices being received, updating the knowledge base based on the received information.

The control method according to an embodiment of the disclosure may further include transmitting the information included in the knowledge base to the plurality of electronic devices.

The obtaining the information related to the obtained object may include determining information corresponding to the obtained object from the knowledge base, and obtaining information having a relationship corresponding to the intent information of the user among information related to the determined information from the knowledge base as the information related to the obtained object.

The control method according to an embodiment of the disclosure may further include displaying the information related to the obtained object.

The obtaining the image may include obtaining the image through a camera of the electronic device based on the user's interaction.

Effect of Invention

According to various embodiments of the disclosure, it is possible to provide various pieces of information on an object obtained from an image. The user may receive information obtained from the knowledge base personalized and constructed based on activities performed on various electronic devices by the user, and accordingly, the user may receive various pieces of information related to his/her experience.

DESCRIPTION OF DRAWINGS

FIG. 3 is a diagram illustrating a device mapping table according to an embodiment;

FIG. 4 is a diagram illustrating an object mapping table according to an embodiment;

DETAILED DESCRIPTION OF EXEMPLARY EMBODIMENTS

Figure 1:
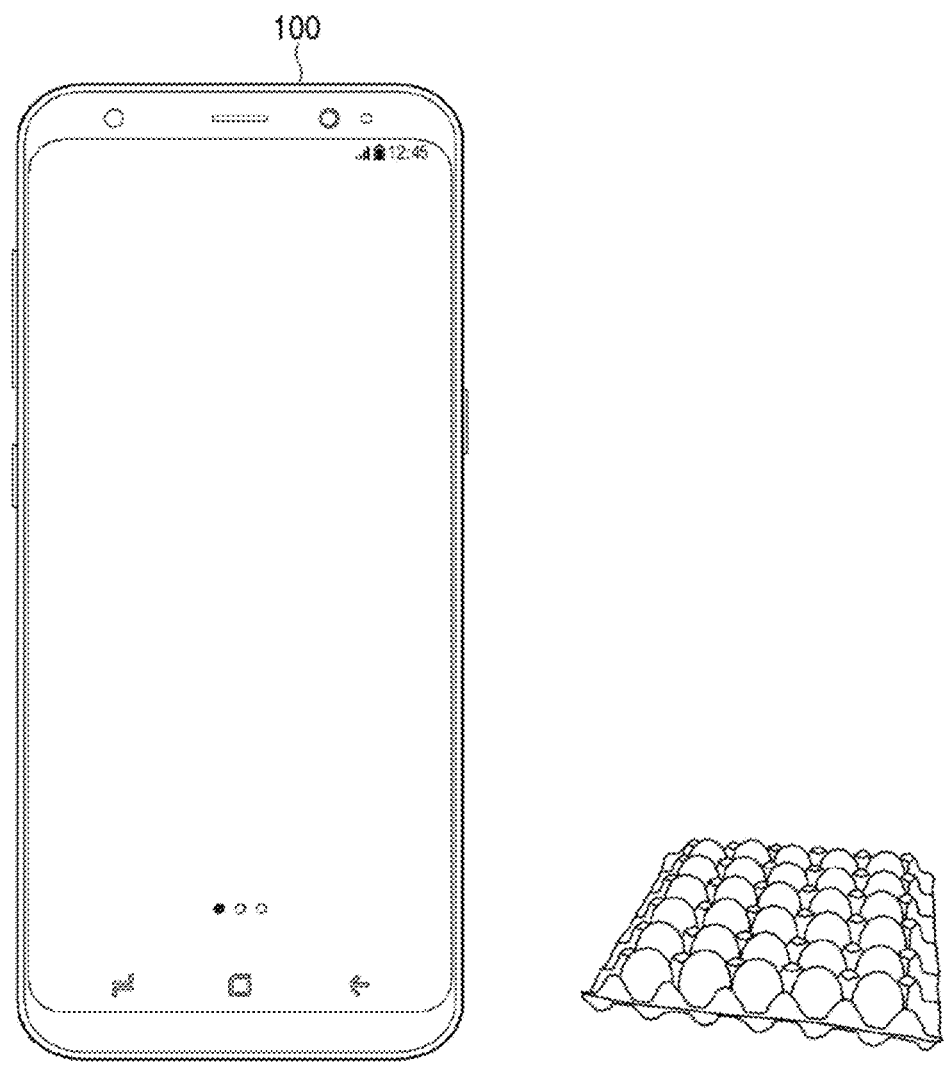
FIG. 1 is a diagram of usage of an electronic device providing information on an object based on a knowledge base according to an embodiment.

Hereinafter, various embodiments of the disclosure will be described with reference to the accompanying drawings. It should be noted that the technologies disclosed in this disclosure are not for limiting the scope of the disclosure to a specific embodiment, but they should be interpreted to include all modifications, equivalents and/or alternatives of the embodiments of the disclosure. In relation to explanation of the drawings, similar reference numerals may be used for similar elements.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

In this disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. Meanwhile, the expression "configured to" does not necessarily refer to a device being "specifically designed to" in terms of hardware. Instead, under some circumstances, the expression "a device configured to" may refer to the device being "capable of" performing an operation together with another device or component. For example, the phrase "a unit or a processor configured (or set) to perform A, B, and C" may refer, for example, and without limitation, to a dedicated processor (e.g., an embedded processor) for performing the corresponding operations, a generic-purpose processor (e.g., a central processing unit (CPU) or an application processor), or the like, that can perform the corresponding operations by executing one or more software programs stored in a memory device.

An electronic device according to various embodiments of the disclosure may include at least one of, for example, a smartphone, a tablet personal computer (PC), a mobile phone, a video phone, an e-book reader, a desktop personal computer (PC), a laptop personal computer (PC), a netbook computer, a workstation, a server, a personal digital assistant (PDA), a portable multimedia player (PMP), an MP3 player, a mobile medical device, a camera, a wearable device, or the like. According to various embodiments, a wearable device may include at least one of an accessory type (e.g., a watch, a ring, a bracelet, an ankle bracelet, a necklace, a pair of glasses, a contact lens or a head-mounted-device (HMD)); a fabric or a garment-embedded type (e.g.: electronic cloth); skin-attached type (e.g., a skin pad or a tattoo); or a bio-implant type (implantable circuit). In addition, in some embodiments, the electronic device may include at least one of, for example, a television, a digital video disk (DVD) player, an audio system, a refrigerator, air-conditioner, a vacuum cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™), an electronic dictionary, an electronic key, a camcorder, an electronic frame, or the like.

In other embodiments, the electronic device may include at least one of a variety of medical devices (e.g., various portable medical measurement devices such as a blood glucose meter, a heart rate meter, a blood pressure meter, or a temperature measuring device, magnetic resonance angiography (MRA), magnetic resonance imaging (MRI), or computed tomography (CT) scanner, or ultrasonic wave device, etc.), a navigation system, a global navigation satellite system (GNSS), an event data recorder (EDR), a flight data recorder (FDR), an automotive infotainment device, a marine electronic equipment (e.g., marine navigation devices, gyro compasses, etc.), avionics, a security device, a car head unit, industrial or domestic robots, a drone, an ATM of financial institution, a point of sale of (POS) a store, or an Internet of Things (IoT) device (e.g., light bulbs, sensors, sprinkler devices, fire alarms, thermostats, street lights, toasters, exercise equipment, hot water tanks, heater, boiler, etc.).

Hereinafter, the disclosure will be described in detail with reference to the drawings.

FIG. 1 is a diagram of usage of an electronic device providing information on an object based on a knowledge base according to an embodiment.

First, an electronic device 100 may detect an object from an image. For example, if a user images a product, for example, eggs, in a store by using the electronic device 100, the electronic device 100 may detect eggs from the image obtained through the imaging.

The electronic device 100 may obtain information related to the object from a knowledge base.

Herein, the knowledge base may include a plurality of pieces of information (or entities) obtained based on user's activities (or experiences) on a plurality of electronic devices including the electronic device 100 and relationship information between these pieces of information. In this case, the relationship information may include information on common characteristics between the related pieces of information and descriptions regarding these pieces of information.

For the knowledge base, a plurality of pieces of information may be stored in a form of a knowledge graph. Meanwhile, if new information is obtained, the electronic device 100 may update the knowledge base by using the new information and relationship information between the pieces of new information. The new information may be obtained based on user's activities on at least one electronic device.

For example, it is assumed that the user performs an activity of putting two eggs in a refrigerator and performs an activity of accessing a website through a mobile phone and searching for the price of eggs.

In this case, the knowledge base may include, with respect to the eggs, information in a graph form in which each of the refrigerator and the mobile phone is connected to the eggs. The relationship information between the refrigerator and eggs may include "there are two" and the relationship information between the refrigerator and the mobile phone may include "AAA (name of website where the price is searched) and 2$ (searched price)".

Accordingly, the electronic device 100 may obtain the information related to the object from the knowledge base and provide the obtained information related to the object.

For example, if the eggs are detected from the image, the electronic device 100 may obtain other information connected to the eggs from the knowledge base and obtain relationship information between the other information and the eggs. In other words, the electronic device 100 may obtain, with respect to the eggs, information indicating that there are two eggs in the refrigerator and information indicating that the price of the eggs searched from the website AAA through the mobile phone corresponds to 2$ from the knowledge base. In addition, the electronic device 100 may display the obtained information on a display provided in the electronic device 100.

As described above, according to various embodiments of the disclosure, various pieces of information on the object obtained from the image may be provided. The user may receive information obtained from the knowledge base personalized and constructed based on activities performed on various electronic devices by the user, and accordingly, the user may receive various pieces of information related to his/her experience.

Figure 2:
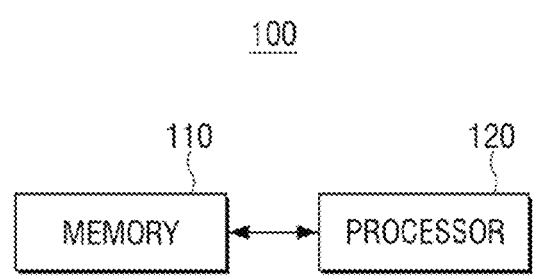
FIG. 2 is a block diagram illustrating a configuration of the electronic device according to an embodiment.

FIG. 2 is a block diagram illustrating a configuration of the electronic device according to an embodiment.

Referring to FIG. 2, the electronic device 100 may include a memory 110 and a processor 120. However, it is not limited to the above configuration and some configurations may be added.

The memory 110 includes at least one instruction. For example, the memory 110 may store at least one instruction related to at least another constituent element of the electronic device 100.

For this, the memory 110 may be implemented as a non-volatile memory, a volatile memory, a flash memory, a hard disk drive (HDD), or a solid state drive (SSD). The memory 110 may be accessed by the processor 120 and reading, recording, editing, deleting, or updating of the data by the processor 120 may be executed. A term, memory, in the disclosure may include the memory 110, a ROM (not illustrated) and RAM (not illustrated) in the processor 120, or a memory card (not illustrated) (e.g., micro SD card or memory stick) mounted on the electronic device 100. In addition, the memory 130 may store data and the like related to at least another constituent element of the electronic device 100.

Further, the memory 110 may store a knowledge base. The knowledge base herein may include device information on a plurality of electronic devices on which user's activities are performed, object information on a plurality of objects obtained based on the activities, and intent information corresponding to pieces of information related to each other. Specifically, the knowledge base may include data in which device information on a plurality of electronic devices on which user's activities are performed, object information on a plurality of objects obtained based on the activities, and an edge representing a relationship between pieces of information related to each other among the device information and the object information are stored as a graph. The edge herein may include intent information corresponding to the information related to each other among the device information and the object information.

Meanwhile, a specific method for generating the knowledge base will be described below.

The processor 120 may be connected to the memory 110 to control the electronic device 100. In other words, the processor 120 may control general operations and functions of the electronic device 100.

In particular, the processor 120 may detect an object from an image, obtain information related to the object by using the knowledge base, and provide information related to the object by executing at least one instruction stored in the memory 110.

Specifically, the processor 120 may obtain an image based on a user's interaction on the electronic device 100, obtain intent information on the user based on an object obtained from the image and context information during the interaction, and obtain information related to the object from the knowledge base stored in the memory 110 based on the user's intent. In this case, the processor 120 may obtain the information related to the object based on the intent information corresponding to the object from the knowledge base.

As described above, the information related to the object may be obtained based on the knowledge base. Hereinafter, a method for generating the knowledge base will be described.

The knowledge base may be generated based on the pieces of information obtained from the activities performed on the plurality of electronic devices by the user.

Specifically, the knowledge base may include pieces of information obtained based on the activities and relationship information between these pieces of information.

In this case, the relationship information may include information on common characteristics between the pieces of information related to each other and descriptions of these pieces of information.

Herein, the information on the common characteristics may include common intent information among intent information corresponding to each of the pieces of information. In addition, the description of the pieces of information is a description of a relationship between the device information and the object information or between pieces of object information according to the user's activity, and may include information on a situation of the object with respect to the device, information on a situation in which the object is obtained through the device, information obtained regarding the object through the device, and the like.

For example, it is assumed that the electronic device 100 is implemented as a refrigerator and the user performs an activity of putting two eggs in the refrigerator.

In this case, the processor 120 may obtain an image of the inside of the refrigerator using a camera for imaging the inside of the refrigerator, and analyze the image to obtain information on a product name, the number of products, and the like of the product stored in the refrigerator. For this, the electronic device 100 may include a camera for imaging the inside of the refrigerator.

For example, the processor 120 may obtain an image obtained by capturing the inside of the refrigerator before a door of the refrigerator is opened and an image obtained by capturing the inside of the refrigerator after the door is closed. In addition, the processor 120 may determine whether there is a newly added product in the refrigerator by comparing these images, and if there is a newly added product in the refrigerator, the processor 120 may analyze the image obtained by capturing the inside of the refrigerator after the door is closed, and obtain information on a product name, the number of products, and the like of the newly added product.

In this case, the processor 120 may analyze the image through various artificial intelligence algorithms. For example, the processor 120 may analyze the image by using an artificial intelligence model (e.g., convolution neural network (CNN) model) capable of obtaining information on the object image.

Accordingly, the processor 120 may obtain information on the user's activity. For example, in the above example, the processor 120 may obtain the information indicating that there are two eggs in the refrigerator with respect to the user's activity of putting two eggs in the refrigerator.

In addition, the processor 120 may generate the knowledge base based on the obtained information. In other words, the processor 120 may generate the knowledge base based on the pieces of information obtained based on the user's activities on the electronic device 100.

Specifically, the processor 120 may generate the device information on the electronic device 100 on which the user's activities are performed, pieces of object information obtained based on the user's activities performed on the electronic device 100, and a relationship between these pieces of information as a graph.

For this, if the user's activity is performed on the electronic device 100, the processor 120 may obtain the device information on the electronic device on which the activity is performed, the object information on at least one object obtained based on the user's activity, and information on the description of these pieces of information.

As in the example described above, it is assumed that the processor 120 obtains the information indicating that there are two eggs in the refrigerator with respect to the user's activity. In this case, the processor 120 may determine that the electronic device on which the activity is performed is the "refrigerator", the object related to the activity is the "eggs", and the description between these pieces of information is "there are two".

In addition, the processor 120 may obtain intent information corresponding to the device information on the electronic device on which the activity is performed and the object information on at least one object obtained based on the user's activity.

For this, the processor 120 may transmit the device information and the object information to an external server (not illustrated). In this case, the electronic device 100 may include a communication interface (not illustrated) for communicating with the server (not illustrated).

The server (not illustrated) may determine characteristics of the device information and the object information received from the electronic device 100 and transmit the determined characteristics information to the electronic device 100.

For this, the server (not illustrated) may store a device mapping table in which the intent information on the electronic device is mapped to each of the electronic device, and an object mapping table in which the intent information on the object is mapped to each of the object.

Accordingly, the server (not illustrated) may determine the intent information corresponding to the electronic device 100 on which the activity is performed by using the device mapping table, determine the intent information corresponding to the object related to the activity by using the object mapping device, and transmit the determined pieces of information to the electronic device 100.

For example, it is assumed that the device mapping table stored in the server (not illustrated) is as shown in FIG. 3.

The device mapping table may include the intent information corresponding to the electronic device for each electronic device. The electronic device and which electronic device includes which intent information may be set in advance according to the characteristics of the electronic device.

For example, referring to FIG. 3, intent information on a television 311 is television 324, intent information on a car 312 is shopping 321 and food 322, intent information on a refrigerator 313 is the shopping 321 and cooking 323, intent information on a mobile phone 314 is the shopping 321, the food 322, the cooking 323, and the television 324, and intent information on glasses 315 is the shopping 321, the food 322, the cooking 323, and the television 324.

Meanwhile, the device mapping table may include various electronic devices and various pieces of intent information other than these. According to an embodiment, some thereof may be omitted from the electronic devices and intent information shown in FIG. 3 and other electronic devices and intent information may be added. In addition, the device mapping table may be updated by adding new electronic devices and intent information to the device mapping table.

Accordingly, the server (not illustrated) may determine the intent information corresponding to the electronic device on which the user's activity is performed by using the device mapping table.

For example, when the user's activity is performed on the refrigerator, the server (not illustrated) may determine that the intent information on the refrigerator is the shopping 321 and the cooking 323 by using the device mapping table illustrated in FIG. 3, and transmit the intent information on the refrigerator to the electronic device 100.

Meanwhile, it is assumed that the object mapping table stored in the server (not illustrated) is as illustrated in FIG. 4.

The object mapping table may include intent information corresponding to the object for each object. The objects and which object includes which intent information may be set in advance according to the characteristics of the object.

For example, referring to FIG. 4, intent information on eggs 411 is shopping 421 and cooking 423, intent information on fried egg 412 is food 422, the cooking 423 and a television 424, intent information on A (name of restaurant) is the food 422, intent information on XXX (title of broadcast program) 414 is the cooking 422 and the television 424, and intent information on YYY (title of broadcast program) 415 is the food 422 and the television 424.

The information on the object, for example, the name of the object may be obtained from open data or obtained through crawling with respect to a database including various store information, product information, menu information, and broadcast program information. However, this is merely an example and the information on the object may be obtained through various methods.

Meanwhile, the object mapping table may include various objects and various intent information other than these. According to an embodiment, some thereof may be omitted from the objects and intent information shown in FIG. 4 and other objects and intent information may be added. In addition, the object mapping table may be updated by adding new objects and intent information to the object mapping table.

Meanwhile, the intent information in FIG. 3 and FIG. 4 may be set in advance. In other words, with respect to the activity that the user performs frequently in daily life, the intent information configuring the device mapping table and the object mapping table may be determined according to with which intent the user performed the corresponding activity. If the user frequently performs the activities with the intent of shopping and food (for example, eating food), cooking and television (for example, watching television), the shopping, the food, the cooking, and the television may be included as the intent information. However, this is an example, and some intent information may be omitted or other intent information may be added.

Accordingly, the server (not illustrated) may determine the intent information corresponding to the object obtained based on the user's activity by using the object mapping table.

For example, if the object related to the user's activity is eggs, the server (not illustrated) may determine that the intent information on the eggs is the shopping 421 and the cooking 423 by using the object mapping table as show in FIG. 4, and transmit the intent information on the eggs to the electronic device 100.

Meanwhile, in the above example, it is described that the device mapping table and the object mapping table are stored in the external server (not illustrated), but this is merely an example. According to an embodiment, the mapping tables may be stored in the memory 110 of the electronic device 100. In this case, the processor 120 may determine the intent information corresponding to the electronic device 100 on which the user's activity is performed and the intent information corresponding to the object obtained based on the user's activity by using the mapping tables stored in the memory 110.

Meanwhile, the processor 120 may determine the common intent information among the pieces of intent information on the device information and the object information, and generate a knowledge base based on the device information, the object information, and the common intent information. An edge representing the relationship between the device information and the object information may include common intent information.

For this, the processor 120 may determine the common intent information between the intent information on the electronic device on which the activity is performed and the intent information on the object, by using the information received from the server (not illustrated).

The processor 120 may set each of the device information and the object information as one node, map the common intent information between these pieces of information to the edge representing the relationship between the nodes, and generate the knowledge base in a form of characteristics graph.

In this case, the processor 120 may map the information on the description between the device information and the object information to the edge.

As in the above example, if the intent information on the refrigerator is the shopping and the cooking and the intent information on the eggs is the shopping, the food and the cooking, the common intent information between the refrigerator and the eggs corresponds to the shopping and the cooking.

Figure 5:
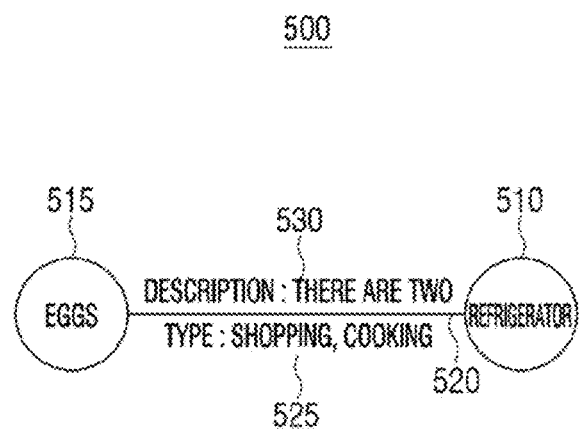
FIG. 5 is a diagram illustrating a knowledge base according to an embodiment.

In this case, the processor 120 may generate a knowledge base 500 as illustrated in FIG. 5. Referring to FIG. 5, in the knowledge base 500, a node 510 of the refrigerator and a node 515 of the eggs are present and an edge 520 representing the relationship between these nodes may include "shopping, cooking" 525 as the common intent information between the refrigerator and the eggs and "there are two" 530 as the description of the refrigerator and the eggs.

As a result, the processor 120 may generate the knowledge base 500 as illustrated in FIG. 5 based on the user's activity of putting the two eggs in the refrigerator.

Meanwhile, if a plurality of objects are obtained based on the user's activity, the processor 120 may determine common intent information among the device information on the device and pieces of object information on the plurality of objects, and generate a knowledge base based on the device information, the pieces of object information, and the common intent information.

The edge representing the relationship between the device information and the object information may include common intent information, that is, common intent information between the device information and the object information. In addition, the edge representing the relationship between the pieces of object information may include common intent information, that is, common intent information between the pieces of object information.

For example, it is assumed that the electronic device 100 is implemented as a television and the user watches a broadcast program XXX (name of broadcast program) showing cooking fried egg using eggs on the television.

In this case, the processor 120 may obtain information on the broadcast program that the user watched, based on the information on the broadcast program provided from a broadcasting station or the like. Accordingly, the processor 120 may obtain, with respect to the user's activity, information indicating that the user watched the broadcast program XXX showing cooking fried egg using eggs on the television.

In this case, the processor 120 may determine that the electronic device on which the activity is performed is the "television", the objects related to the activity are "XXX", "fried egg", and "eggs", and the description between these pieces of information is "watched on television".

The processor 120 may transmit the device information on the electronic device on which the activity is performed and the object information on the plurality of objects obtained based on the user's activity to the server (not illustrated), and obtain the intent information corresponding to the device information and the intent information corresponding to the pieces of object information from the server (not illustrated).

The processor 120 may determine the common intent information between the device information and the object information, determine the common intent information between the pieces of object information, and generate a knowledge base by using the device information, the pieces of object information, and the common intent information.

Specifically, the processor 120 may set each of the device information and the object information as one node, map the common intent information between these pieces of information to the edge representing the relationship between the nodes, set each of the pieces of object information as one node, map the common intent information between these pieces of information to the edge representing the relationship between the nodes, and generate the knowledge base in a form of characteristics graph.

In this case, the processor 120 may map the information on the description between the device information and the object information to the edge between the device information and the object information, and map the information on the description between the pieces of object information to the edge between the pieces of object information.

In a case of the above example, referring to FIGS. 3 and 4, the intent information on the television corresponds to television, the intent information on XXX corresponds to the cooking and the television, the intent information on the fried egg corresponds to the food and the cooking, and the intent information on the eggs corresponds to the shopping and the cooking. In this case, the common intent information between the television and XXX corresponds to the television, the common intent information between XXX and fried egg corresponds to the cooking, and the common intent information between the fried egg and eggs corresponds to the cooking.

Figure 6:
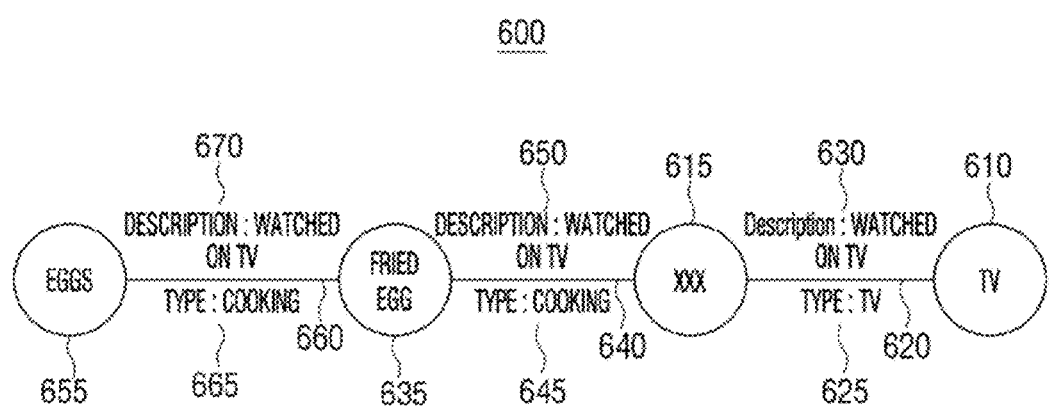
FIG. 6 is a diagram illustrating a knowledge base according to an embodiment.

Accordingly, the processor 120 may generate a knowledge base as illustrated in FIG. 6. Referring to FIG. 6, a knowledge base 600 may include a node 610 of the television, a node 615 of XXX, a node 635 of the fried egg, and a node 655 of the eggs. An edge 620 representing the relationship between the television and XXX may include a "television" 625 as the common intent information between the television and XXX and "watched on television" 630 as the description of the television and XXX, an edge 640 representing the relationship between XXX and the fried egg may include "cooking" 645 as the common intent information between XXX and the fried egg and "watched on television" 650 as the description of the XXX and the fried egg, and an edge 660 representing the relationship between the fried egg and the eggs may include "cooking" 665 as the common intent information between the fried egg and the eggs and "watched on television" 670 as the description of the fried egg and the eggs.

As a result, the processor 120 may generate the knowledge base 600 as illustrated in FIG. 6 based on the user's activity of watching the broadcast program XXX showing the cooking of the fried egg using the eggs through the television.

In another example, it is assumed that the electronic device 100 is implemented as a television and the user watches a broadcast program YYY (name of broadcast program) providing information on a restaurant A (name of restaurant) for the fried egg through the television.

In this case, the processor 120 may obtain information on the broadcast program watched by the user based on the information on the broadcast program provided from the broadcasting station and the like. Accordingly, the processor 120 may obtain, with respect to the user's activity, information indicating that the user watched the broadcast program YYY providing the information on the restaurant A for the fried egg through the television.

In this case, the processor 120 may determine that the electronic device on which the activity is performed is "television" and the objects related to the activity are "YYY", "A", and "fried egg", and the description between these pieces of information is "watched on television".

Meanwhile, referring to FIGS. 3 and 4, the intent information on the television corresponds to the television, the intent information on the YYY corresponds to the food and the television, the intent information on A corresponds to the food, and the intent information on the fried egg corresponds to the food and the cooking. In this case, the common intent information between the television and the YYY corresponds to the television, the common intent information between the YYY and A corresponds to the food, the common intent information between the YYY and the fried egg corresponds to the food, and the common intent information between the A and the fried egg corresponds to the food.

Figure 7:
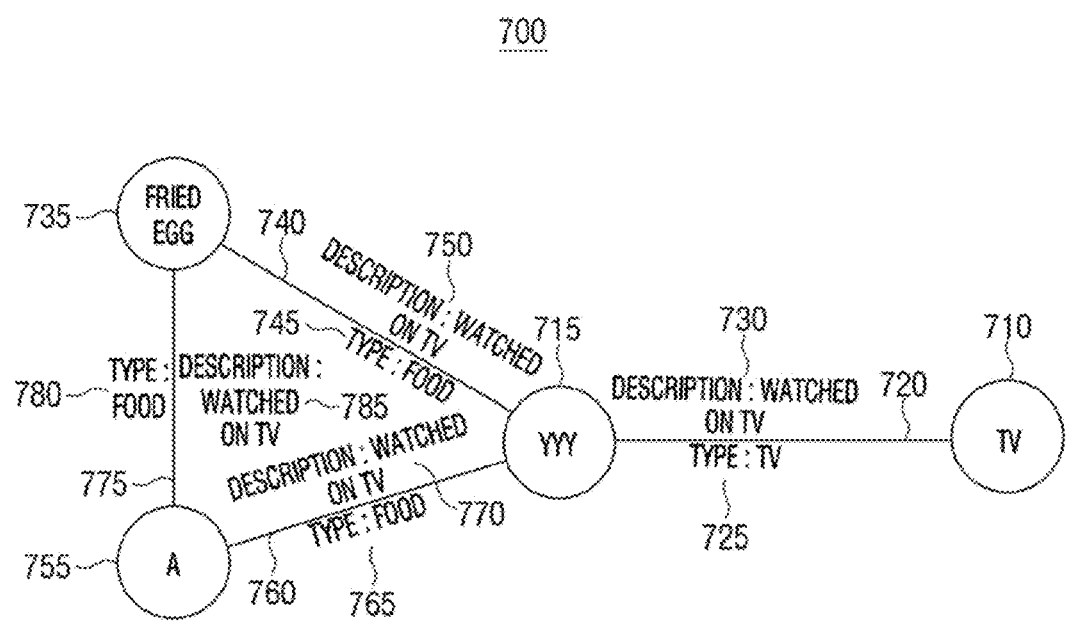
FIG. 7 is a diagram illustrating a knowledge base according to an embodiment.

Accordingly, the processor 120 may generate a knowledge base as illustrated in FIG. 7. Referring to FIG. 7, a knowledge base 700 may include a node 710 of the television, a node 715 of the YYY, a node 735 of the fried egg, and a node 755 of the A.

An edge 720 representing the relationship between the television and YYY includes "television" 725 as the common intent information between the television and YYY and "watched on television" 730 as the description of the television and YYY, an edge 740 representing the relationship between the YYY and the fried egg may include "food" 745 as the common intent information between the YYY and the fried egg and "watched on television" 750 as the description of the YYY and the fried egg, an edge 760 representing the relationship between the YYY and the A may include "food" 765 as the common intent information between the YYY and the A and "watched on television" 770 as the description of the YYY and the A, and an edge 775 representing the relationship between the fried egg and the A may include "food" 780 as the common intent information between the fried egg and the A and "watched on television" 785 as the description of the fried egg and the A.

As a result, the processor 120 may generate the knowledge base 700 as illustrated in FIG. 7 based on the user's activity of watching the broadcast program YYY providing the information on the restaurant A for the fried egg through the television.

In still another example, it is assumed that the electronic device 100 is implemented as a mobile phone and the user searches for price of the eggs on a website B through the mobile phone.

In this case, the processor 120 may analyze a website that the user accessed, a keyword input to the corresponding website, and a search result and obtain, with respect to the user's activity, information indicating that the price of the eggs searched from the website B corresponds to 1.6$. In this case, the processor 120 may determine that the electronic device on which the activity is performed is "mobile phone", the object related to the activity is "eggs", and the description between these pieces of information is that "price of eggs on the website B is 1.6$".

Meanwhile, referring to FIGS. 3 and 4, the intent information on the mobile phone corresponds to shopping, food, cooking, and television, and the intent information on the eggs corresponds to shopping and cooking. In this case, the common intent information between the mobile phone and the eggs corresponds to shopping and cooking.

Figure 8:
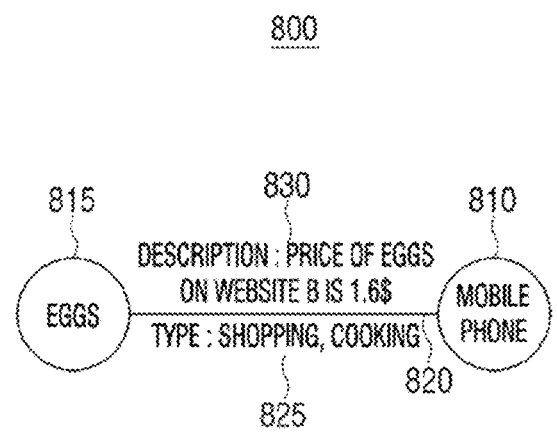
FIG. 8 is a diagram illustrating a knowledge base according to an embodiment.

Accordingly, the processor 120 may generate a knowledge base as illustrated in FIG. 8. Referring to FIG. 8, a knowledge base 800 may include a node 810 of the mobile phone and a node of 815 of the eggs, and an edge 820 representing the relationship between the mobile phone and the eggs may include "shopping, cooking" 825 as the common intent information between the mobile phone and the eggs and "price of eggs on the website B is 1.6$" 830 as the description of the mobile phone and the eggs.

As a result, the processor 120 may generate the knowledge base 800 as illustrated in FIG. 8 based on the user's activity of searching for the price of the eggs on the website B through the mobile phone.

In still another example, it is assumed that the electronic device 100 is implemented as glasses (e.g., augmented reality (AR) glasses) and the user wears the glasses and images potatoes displayed in a store and the price of the potatoes.

In this case, the processor 120 may analyze the captured image to obtain information on the potatoes and the price of the potatoes, and obtain information indicating that the user is in the store based on location information of the glasses. Accordingly, the processor 120 may obtain, with respect to the user's activity, information indicating that the price of the potatoes in the store corresponds to 2$.

In this case, the processor 120 may determine that the electronic device on which the activity is performed is the "glasses", the object related to the activity is "potatoes", and the description between these pieces of information is that "price of potatoes in the store is 2$".

Meanwhile, referring to FIGS. 3 and 4, the intent information on the glasses corresponds to shopping, food, cooking, and television, and the intent information on the potatoes corresponds to shopping and cooking. In this case, the common intent information between the glasses and the potatoes corresponds to shopping and cooking.

Figure 9:
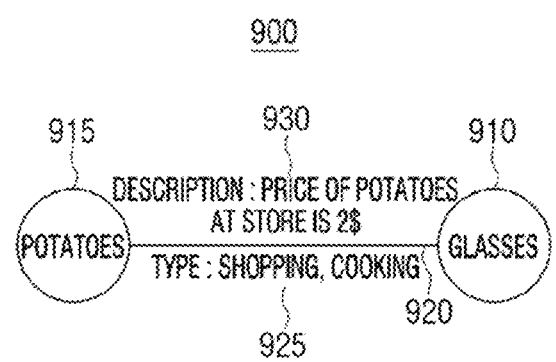
FIG. 9 is a diagram illustrating a knowledge base according to an embodiment.

Accordingly, the processor 120 may generate a knowledge base as illustrated in FIG. 9. Referring to FIG. 8, a knowledge base 900 may include a node 910 of the glasses and a node 915 of the potatoes, and an edge 920 representing the relationship between the glasses and the potatoes may include "shopping, cooking" 925 as the common intent information between the glasses and the potatoes and "price of potatoes in the store is 2$" 930 as the description of the mobile phone and the potatoes.

As a result, the processor 120 may generate the knowledge base 900 as illustrated in FIG. 9 based on the user's activity of imaging the potatoes displayed in the store through the glasses.

Through the above method, the processor 120 may generate the knowledge base.

Meanwhile, the processor 120 may update (or extend) the knowledge base based on the information newly obtained based on the user's activity on the electronic device 100.

In other words, if the user's activity is performed on the electronic device 100, the processor 120 may update the knowledge base stored in the memory 110 by using the information newly or additionally obtained based on the activity.

For this, the processor 120 may determine whether matching information among the device information and the object information obtained based on the user's activity is present in the knowledge base.

Accordingly, if the matching information is not present in the knowledge base, the processor 120 may store the newly obtained information in the memory 110 and update the knowledge base. In this case, since the pieces of information stored in the memory 110 do not match to the pieces of information present in advance in the knowledge base, the pieces of information may be stored in the knowledge base not to be related to the pieces of information present in advance in the knowledge base.

However, if the matching information is present in the knowledge base, the processor 120 may update the knowledge base stored in the memory 110 by adding the newly obtained information based on the matching information to the existing knowledge base.

For example, it is assumed that, in the memory 110, the knowledge base 600 includes the pieces of information as illustrated in FIG. 6 and the pieces of information as illustrated in FIG. 7 are obtained by the user's activity.

In this case, the television information 610 in the knowledge base 600 may match to the television information 710 among the information obtained by the user's activity and the fried egg information 635 in the knowledge base 600 may match to the fried egg information 735 among the information obtained by the user's activity.

Accordingly, the processor 120 may update the knowledge base by adding newly obtained pieces of information based on the matching information.

Specifically, the processor 120 may update the knowledge base by adding the newly obtained television information 710 based on the television information 610 of the knowledge base 600 and the pieces of information related thereto in a stepwise manner, and adding the newly obtained fried egg information 735 based on the fried egg information 635 of the knowledge base 600 and the pieces of information related thereto in a stepwise manner.

Figure 10:
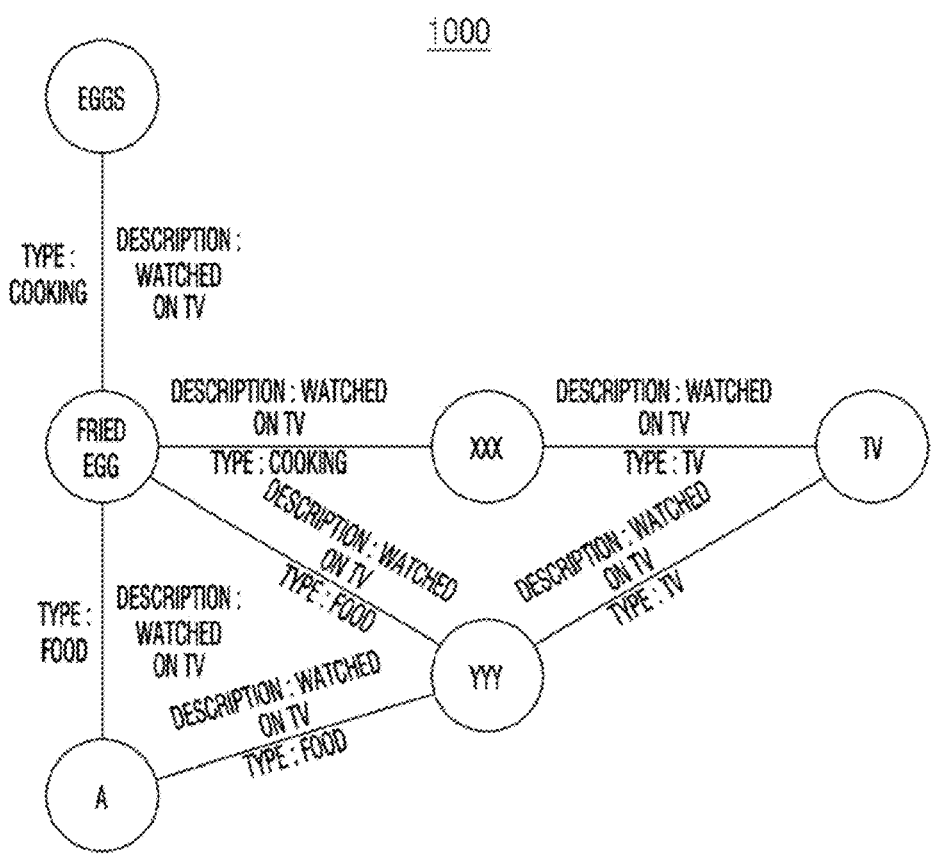
FIG. 10 is a diagram illustrating a knowledge base according to an embodiment.

As described above, the processor 120 may update the knowledge base and an updated knowledge base 1000 may be illustrated as in FIG. 10.

In addition, if the newly obtained information is received based on the user's activity performed on the plurality of electronic devices, the processor 120 may update the knowledge base based on the received information. For this, the electronic device 100 may include a communication interface (not illustrated) for communicating with the plurality of electronic devices.

Herein, the plurality of electronic devices may be devices configuring the environment of Internet of Things (IoT) together with the electronic device 100.

Figure 11:
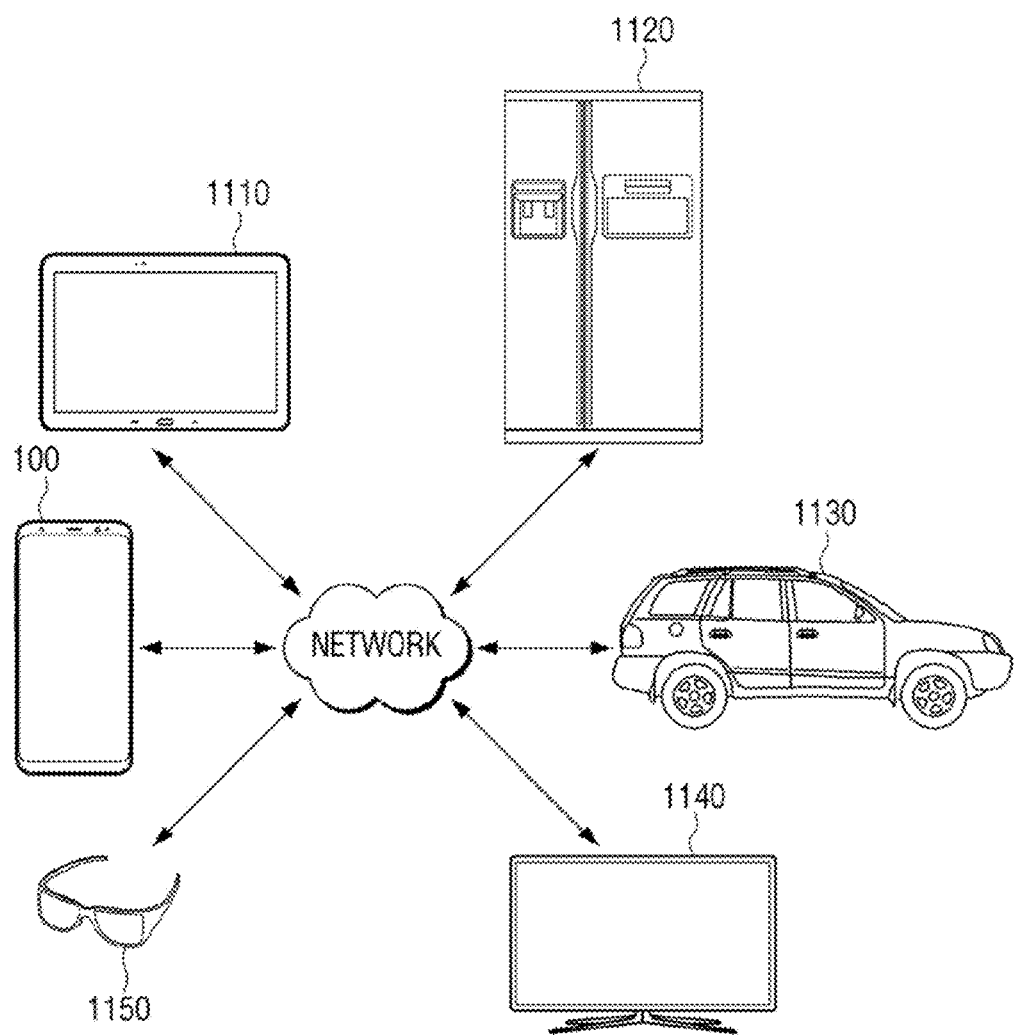
FIG. 11 is a diagram illustrating electronic devices configuring an IoT environment according to an embodiment.

For example, referring to FIG. 11, the electronic device 100 and a plurality of electronic devices 1110, 1120, 1130, 1140, and 1150 may be connected via a network and transmit and receive various data.

In this case, the processor 120 may receive pieces of information obtained by the plurality of electronic devices based on the user's activities performed on the plurality of electronic devices from the plurality of electronic devices, and update the knowledge base stored in the memory 110 based on the received pieces of information.

The plurality of electronic devices may transmit the pieces of information included in the knowledge base to the electronic device 100.

Specifically, the plurality of electronic devices may transmit device information, object information, common intent information between the device information and the object information, description of the device information and the object information, common intent information between pieces of object information, description of pieces of object information, and the like included in the knowledge base to the electronic device 100.

A method for the plurality of electronic devices to obtain the pieces of information based on the user's activity on the plurality of electronic devices is the same as the method for the electronic device 100 to obtain the pieces of information based on the user's activity on the electronic device 100, and therefore, the specific description thereof will not be repeated, since this has been descried above. In addition, a method for the electronic device 100 to update the knowledge base using the pieces of information received from the plurality of electronic devices is the same as the method for the electronic device 100 to update the knowledge base using the pieces of information newly obtained by the user's activity on the electronic device 100, and therefore, the specific description thereof will not be repeated, since this has been descried above.

Figure 12:
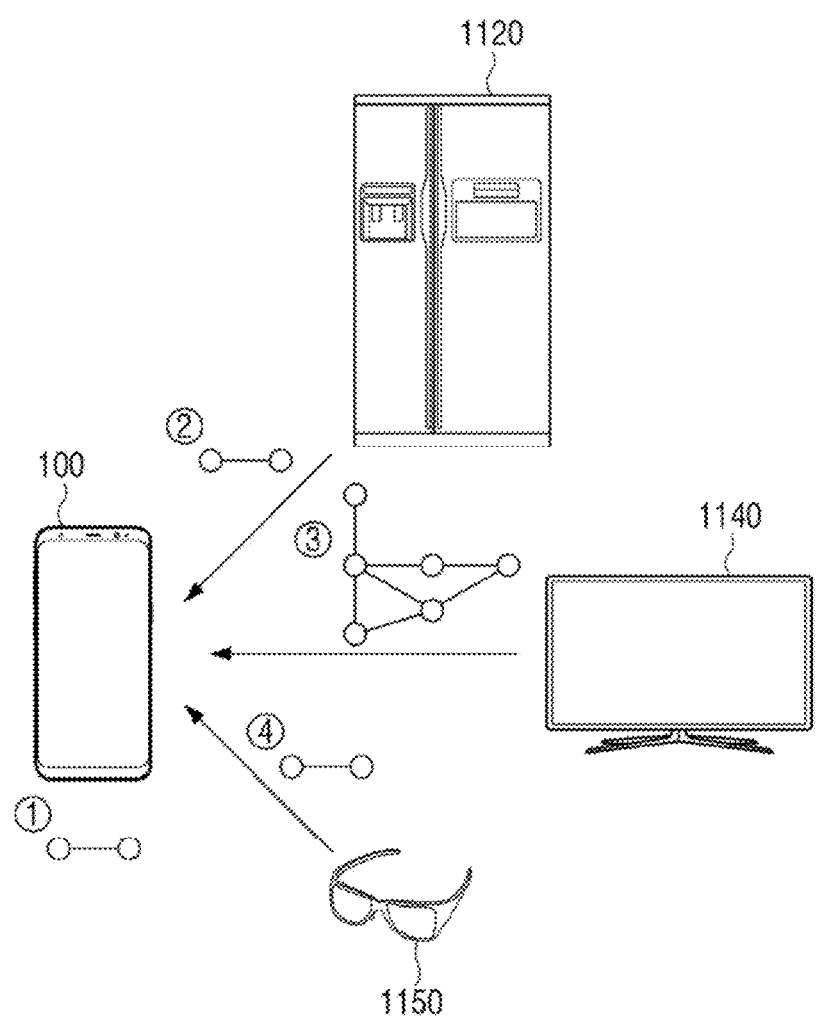
FIG. 12 is a diagram illustrating that information is received from electronic devices according to an embodiment.

For example, referring to FIG. 12, it is assumed that the electronic device 100 is implemented as a mobile phone and receives the pieces of information from the refrigerator 1120, the television 1140, and the glasses 1150.

In this case, it is assumed that the knowledge base stored in the electronic device 100 is as illustrated in FIG. 8 (e.g., ① of FIG. 12). In addition, it is assumed that, the refrigerator 1120 transmits the pieces of information (e.g., ② of FIG. 12) included in the knowledge base as illustrated in FIG. 5 to the electronic device 100, the television 1140 transmits the pieces of information (e.g., ③ of FIG. 12) included in the knowledge base as illustrated in FIG. 10 to the electronic device 100, and the glasses 1150 transmits the pieces of information (e.g., ④ of FIG. 12) included in the knowledge base as illustrated in FIG. 9 to the electronic device 100.

Accordingly, the processor 120 may update the knowledge base stored in the memory 110 using the received pieces of information.

In this case, the eggs information of the knowledge base stored in the electronic device 100 may match to the eggs information received from the refrigerator 1120 and the eggs information received from the television 1140. Accordingly, the processor 120 may update the knowledge base stored in the memory 110 by, based on the eggs information of the knowledge base, adding the eggs information received from the refrigerator 1120 and the pieces of information related thereto in a stepwise manner and adding the eggs information received from the television 1140 and the pieces of information related thereto in a stepwise manner.

However, the information received from the glasses 1150 does not match to the information of the knowledge base, and accordingly, the processor 120 may update the knowledge base by storing the information received from the glasses 1150 in the memory 110 to not form the relationship with the other pieces of information.

Figure 13:
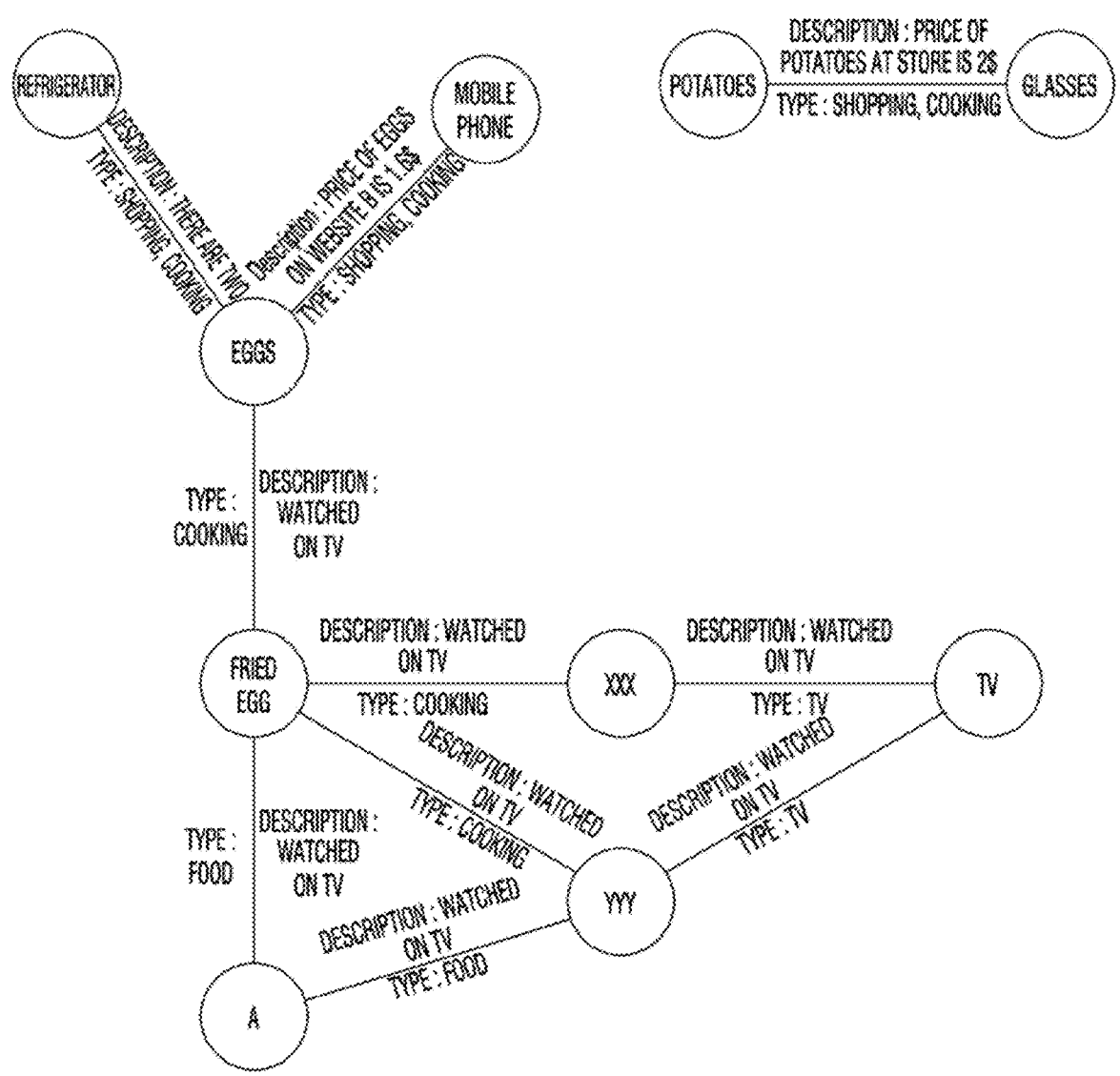
FIG. 13 is a diagram illustrating a knowledge base according to an embodiment.

As described above, the processor 120 may update the knowledge base and an updated knowledge base 1300 may be illustrated as in FIG. 13.

Meanwhile, the processor 120 may transmit the pieces of information included in the knowledge base stored in the memory 110 to the plurality of electronic device. In addition, the plurality of electronic devices may transmit the pieces of information included in the knowledge base thereof to the other electronic device.

In addition, the plurality of electronic devices may update the knowledge base thereof using the received pieces of information. The method for each electronic device to update the knowledge base is the same as the method for the electronic device 100 to update the knowledge base.

As a result, the plurality of electronic devices (including the electronic device 100) configuring the environment of IoT may construct the knowledge base by using the pieces of information obtained based on the activity performed by the user on other electronic devices, in addition to the pieces of information obtained based on the activity performed by the user on the corresponding electronic device, and accordingly, these electronic devices may construct the same knowledge bases.

As described above, according to the various embodiments of the disclosure, the plurality of electronic devices configuring the environment of IoT may update the knowledge base using the received pieces of information from the other electronic device, and accordingly, the plurality of electronic devices may include one knowledge base, that is, the same knowledge base.

Meanwhile, the processor 120 may provide information related to the object using the knowledge base.

For this, the processor 120 may obtain an image based on the user's interaction on the electronic device 100.

For example, the electronic device 100 may further include a camera and the processor 120 may obtain the image based on the user's interaction through the camera. In other words, when a user command for the imaging command is input, the processor 120 may obtain the image by performing the imaging through the camera.

In addition, the processor 120 may obtain the image through various methods. If a user input for selecting one point of the electronic device 100 is detected, the processor 120 may generate a captured image by capturing a screen displayed on the electronic device 100 in response to the user input. In addition, the processor 120 may receive the image from an external server, other electronic devices, and the like in response to the input user command, and obtain the image stored in the memory 110.

The processor 120 may obtain the object from the image. In this case, the processor 120 may analyze the image through various artificial intelligence algorithms. For example, the processor 120 may analyze the image by using an artificial intelligence model (e.g., convolution neural network (CNN) model) capable of obtaining the information on the object image. Such a model may be stored in the memory 110 in advance. In this case, the artificial intelligence model may be implemented as a software module and stored in the memory 110, or may be manufactured in a form of at least one hardware chip and mounted on the electronic device 100.

The processor 120 may obtain the intent information on the user based on the object obtained from the image and the context information during the interaction.

Herein, the context information may be time information and weather information at a time point when the user's interaction is input or a time point when an image is obtained, location information on the electronic device 100, and the like. The time point herein may be a time point when the user's interaction is input or the image is obtained or may be within a certain period of time (e.g., 1 second to 10 seconds) from the corresponding time point.

In this case, the processor 120 may obtain the intent information of the user using the trained model. The trained model may be implemented as a software module and stored in the memory 110, or may be manufactured in a form of at least one hardware chip and mounted on the electronic device 100.

Herein, the model may be a model trained using the object information, the context information, and the intent information as training data. Accordingly, the trained model may be trained so as to have a criterion for determining which intent information matches to the object information and the context information.

In this case, the trained model may be trained based on a rule or trained based on machine learning.

Accordingly, if the object information and the context information are input, the trained model may output the intent information matching to the corresponding pieces of information.

For example, if the object is food such as eggs, potatoes, meat, vegetables, and the like and the location information indicates a store, the trained model may output an output value representing that the intent information matching thereto is shopping and cooking. In addition, if the object is a television and the location information indicates a store, the trained model may output an output value representing that the intent information matching thereto is shopping. Further, if the object is the television and the location information indicates a house, the trained model may output an output value indicating that the intent information matching thereto is the television. Moreover, if the object is a restaurant name, the location information indicates street, and the time information indicates night, the trained model may output an output value indicating that the intent information matching thereto indicates food. In addition, the model may be trained to output, according to various pieces of object information and context information, the intent information matching thereto.

Meanwhile, the intent information used as the training data of the model may be set in advance. In other words, with respect to the activity that the user frequently performs in daily life, the intent information used as the training data may be determined according to with which intent the user performed the corresponding activity.

If the user frequently performs the activity with the intent of shopping, food (e.g., eating food), cooking, and television (e.g., watching television), the intent information used as the training data may include shopping, food, cooking, and television. However, this is an example and some intent information may be omitted or other intent information may be added.

Hereinafter, the processor 120 may obtain the information related to the object obtained from the image from the knowledge base stored in the memory 110 based on the intent information of the user.

In this case, the processor 120 may obtain the information related to the object obtained from the image based on the intent information corresponding to the object obtained from the image from the knowledge base.

Specifically, the processor 120 may determine the information corresponding to the object obtained from the image from the knowledge base. In other words, the processor 120 may determine the object information matching to the object information obtained from the image from the knowledge base.

In addition, the processor 120 may obtain the information having a relationship corresponding to the intent information of the user among the information related to the determined information, as the information related to the object obtained from the image.

Specifically, the processor 120 may determine the device information or other object information having a relationship with the determined object information through the edge, and obtain pieces of information having a relationship with the object information determined through the edge including the intent information matching to the intent information of the user among the pieces of determined information, and the description of these pieces of information included in the corresponding edge, as the information related to the object obtained from the image.

In addition, the processor 120 may provide the information related to the object obtained from the image. For example, the electronic device 100 may further include a display and the processor 120 may display the obtained information related to the object on a display.

In addition, the electronic device 100 may provide the information related to the object through various methods. For example, if a microphone is provided in the electronic device 100, the processor 120 may output the obtained information related to the object through the microphone.

Hereinafter, the examples of obtaining and providing the information related to the object according to various embodiments of the disclosure will be described with reference to FIGS. 14 to 16.

In this case, it is assumed that the electronic device 100 is implemented as a mobile phone and the knowledge base stored in the memory 110 of the electronic device 100 includes the pieces of information illustrated in FIG. 13.

Figure 14A:
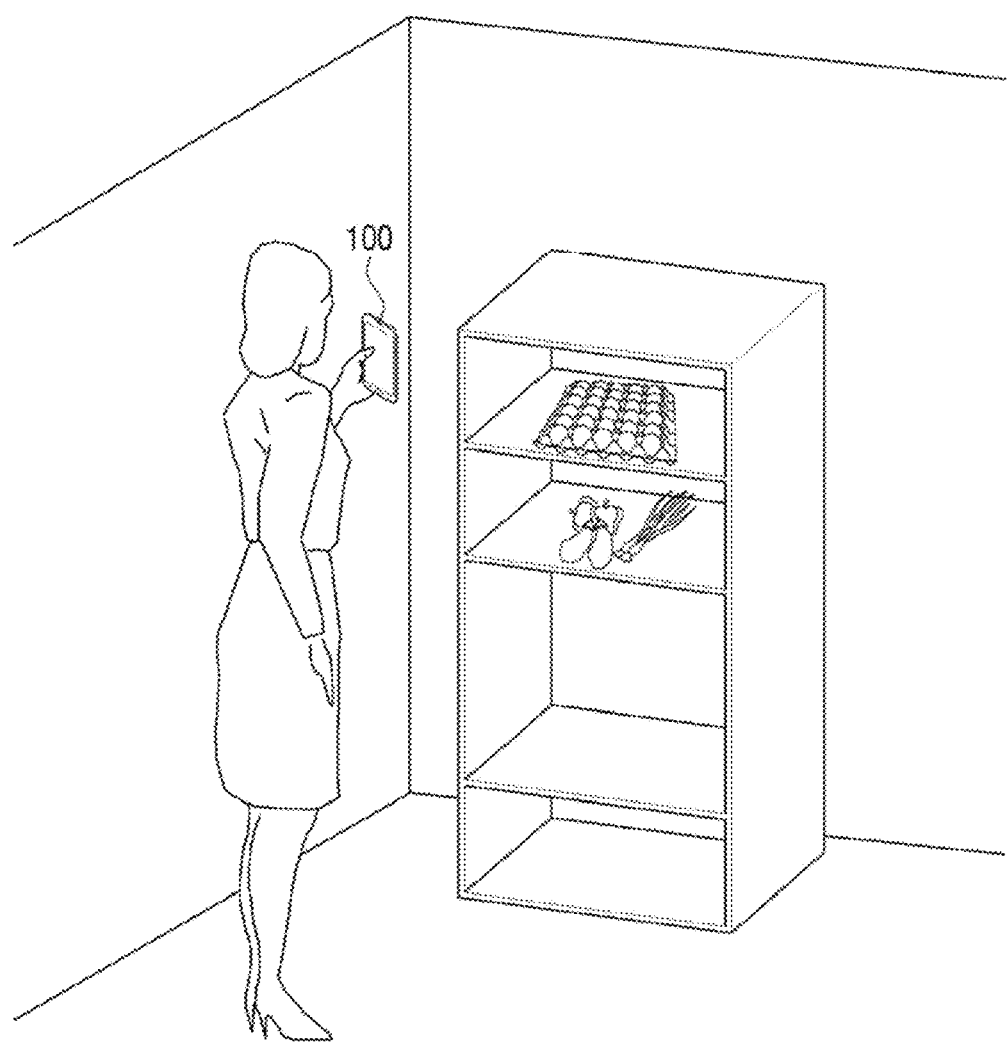
FIGS. 14A, 14B, and 14C are diagrams illustrating a method for providing information related to an object according to an embodiment.
Figure 14B:
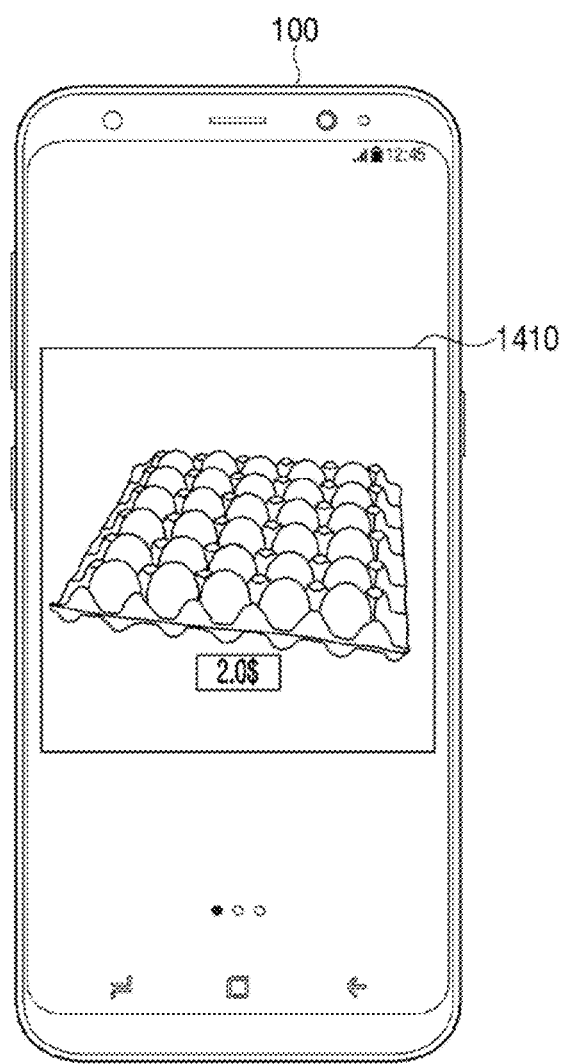

For example, referring to FIG. 14A, it is assumed that a user in a store images eggs displayed in the store through the electronic device 100. In this case, the processor 120 may perform the imaging through the camera of the electronic device 100 and display an image 1410 obtained through the imaging on a display of the electronic device 100 as illustrated in FIG. 14B.

The processor 120 may analyze the image and detect an object from the image obtained by capturing the eggs displayed in the store. For example, the corresponding image includes eggs, a tag with the price of the eggs, and the like, and accordingly, the processor 120 may obtain the eggs, the tag, and the like from the image through image analysis.

Then, the processor 120 may obtain intent information of the user who captures an image of the eggs, by using the obtained objects and context information at the time point when the eggs are imaged.

Specifically, the processor 120 may obtain the intent information of the user from the trained model by using the information on the eggs, the tag, and the like which are the obtained objects and the location information (e.g., store) indicating the place where the user is present at the time point when the eggs are imaged, as input data of the trained model.

In this case, if the intent information of the user obtained from the trained model corresponds to shopping, the processor 120 may obtain the information related to the object from the knowledge base by using this.

Specifically, referring to FIG. 13, the knowledge base includes eggs which is the object information matching to the eggs. In this case, the processor 120 may determine whether there is information related to the shopping which is the intent of the user, among the refrigerator, the mobile phone, and the fried egg which are related to the eggs.

Specifically, referring to FIG. 13, the common intent information between the eggs and the refrigerator is shopping and cooking, and accordingly, it includes the shopping corresponding to the intent information of the user, and the common intent information between the eggs and the mobile phone is shopping and cooking, and accordingly, it includes the shopping corresponding to the intent information of the user. However, since the common intent information between the eggs and the fried eggs is cooking, it is not related to the shopping that is predicted as the intent of the user who captured the image of the eggs in the store.

Accordingly, the processor 120 may determine the refrigerator and the mobile phone as the information related to the shopping which is the intent of the user, among the pieces of information related to the eggs.

In addition, the processor 120 may obtain the information on the refrigerator and the mobile phone, the description of the eggs and the refrigerator, and the description of the eggs and the mobile phone, as the information related to the eggs included in the image captured by the user, and display the information related to the eggs on a display using these.

For example, referring to FIG. 13, the description of the eggs and the refrigerator corresponds to "there are two" and the description of the eggs and the mobile phone corresponds "price of eggs on the website B is 1.6$".

Figure 14C:
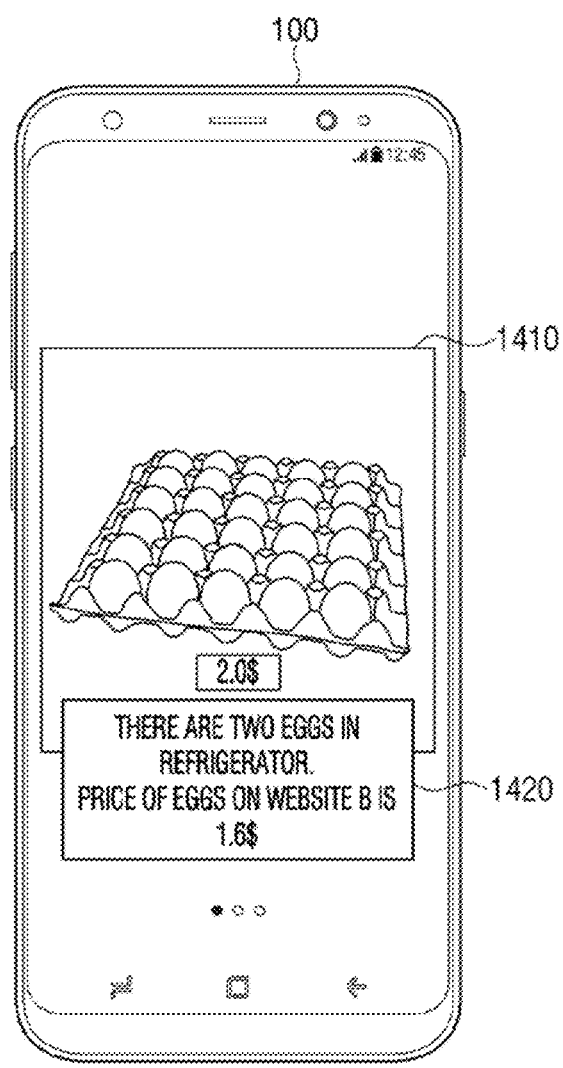

Therefore, using these pieces of information, the processor 120 may display information 1420 indicating that "there are two eggs in the refrigerator" and "price of eggs on the website B is 1.6$" on the display, as illustrated in FIG. 14C.

Figure 15A:
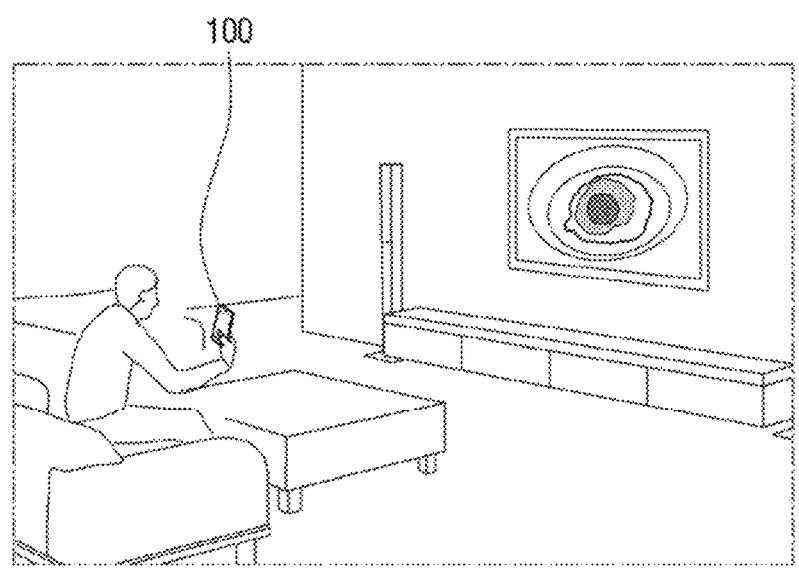
FIGS. 15A, 15B, and 15C are diagrams illustrating a method for providing information related to an object according to an embodiment.
Figure 15B:
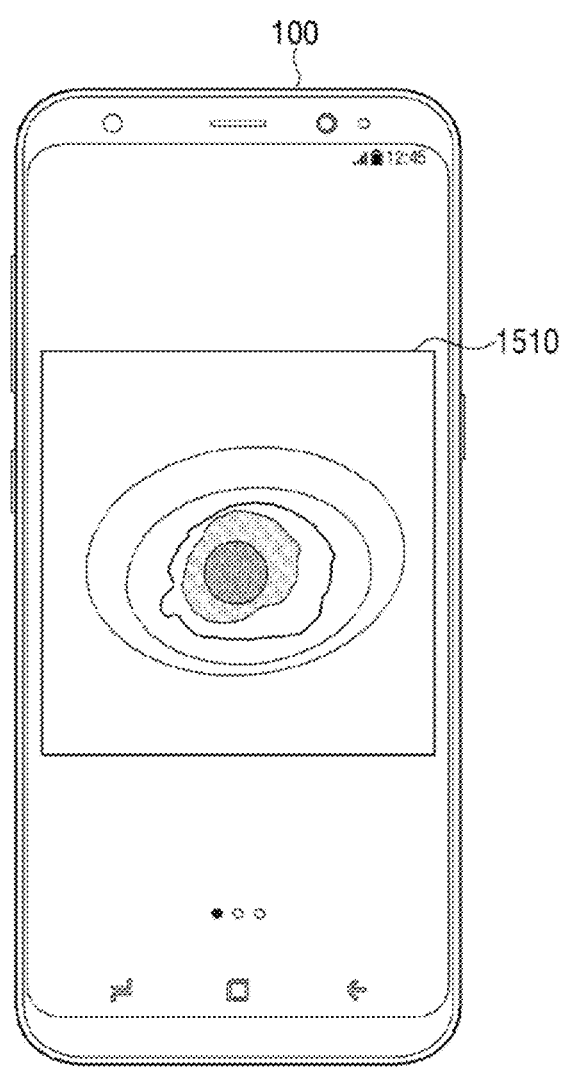

In another example, referring to FIG. 15A, it is assumed that a user in a house images fried egg on a TV through the electronic device 100. In this case, the processor 120 may perform the imaging through the camera of the electronic device 100 and display an image 1510 obtained through the imaging on the display of the electronic device 100, as illustrated in FIG. 15B.

In addition, the processor 120 may analyze the image and detect an object from the image obtained by capturing the fried egg on the TV. For example, since the corresponding image includes the fried egg and the like, the processor 120 may obtain the fried egg and the like from the image through the image analysis.

Then, the processor 120 may obtain the intent information of the user capturing the fried egg, by using the obtained object and context information at the time when the fried egg is captured.

Specifically, the processor 120 may obtain the intent information of the user from the trained model by using the information on the fried egg and the like which are the obtained objects and the location information (e.g., house) indicating the place where the user is present at the time when the fried egg is captured, as input data of the trained model.

In this case, if the intent information of the user obtained from the trained model corresponds to cooking, the processor 120 may obtain the information related to the object from the knowledge base using this.

Specifically, referring to FIG. 13, the knowledge base includes fried egg which is the object information matching to the fried egg.

In this case, the processor 120 may determine whether there is information related to the cooking which is the intent of the user, among eggs, XXX, YYY, and A which are related to the fried eggs.

Specifically, referring to FIG. 13, the common intent information between the fried egg and the eggs is cooking, and accordingly, it includes the cooking corresponding to the intent information of the user, and the common intent information between the fried egg and the XXX is cooking, and accordingly, it includes the cooking corresponding to the intent information of the user. However, since the common intent information between the fried egg and the YYY is food and the common intent information between the fried egg and the A is food, it is not related to the cooking that is predicted as the intent of the user who captured the fried egg in the house.

Accordingly, the processor 120 may determine the eggs and XXX as the information related to the cooking which is the intent of the user, among the pieces of information related to the fried egg.

In addition, the processor 120 may obtain the information on the eggs and XXX, the description of the fried egg and the eggs, and the description of the fried egg and the XXX, as the information related to the fried egg included in the image captured by the user, and display the information related to the fried egg on a display using these.

For example, referring to FIG. 13, the description of the fried egg and the eggs corresponds to "watched on television" and the description of the fried egg and the XXX corresponds to "watched on television".

Figure 15C:
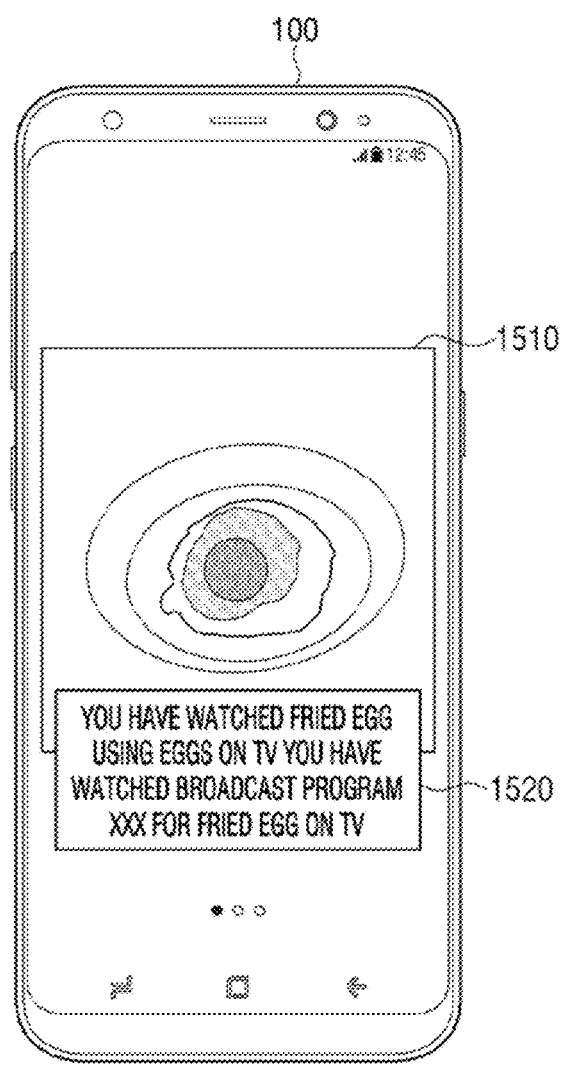

Therefore, using these pieces of information, referring to FIG. 15C, the processor 120 may display information 1520 indicating that "you have watched fried egg using eggs on television" and "you have watched broadcast program XXX for fried egg on television" on the display.

Figure 16A:
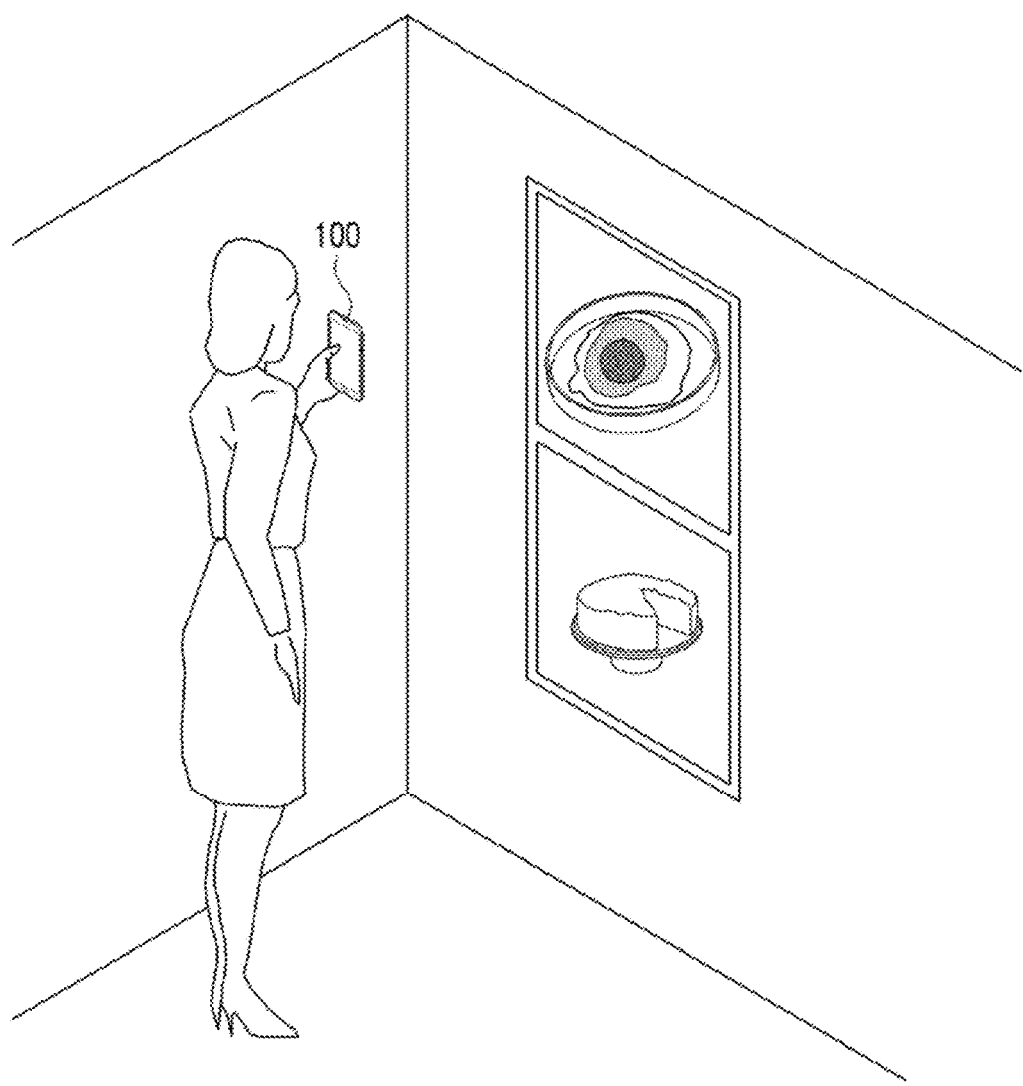
FIGS. 16A, 16B, and 16C are diagrams illustrating a method for providing information related to an object according to an embodiment.
Figure 16B:
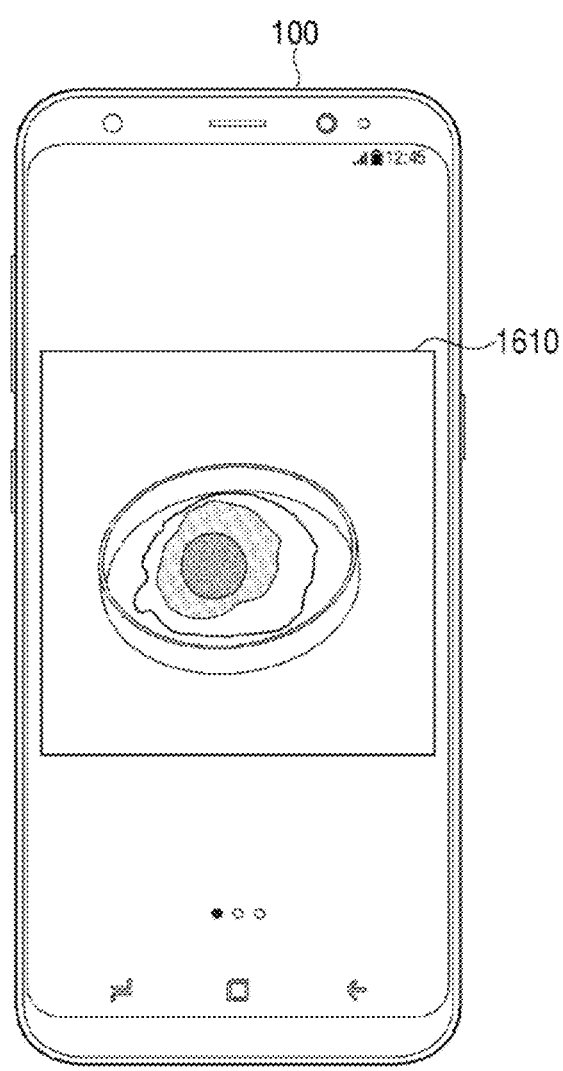

In still another example, referring to FIG. 16A, it is assumed that the user on a street images fried egg included in an advertisement image through the electronic device 100. In this case, the processor 120 may perform the imaging through the camera of the electronic device 100 and display an image 1610 obtained through the imaging on the display of the electronic device 100, as illustrated in FIG. 16B.

In addition, the processor 120 may analyze the image and detect an object from the image obtained by imaging the fried egg included in the advertisement image. For example, the corresponding image includes the fried egg and the like, and accordingly, the processor 120 may obtain the fried egg and the like from the image through image analysis.

Then, the processor 120 may obtain intent information of the user who captures an image of the fried egg, by using the obtained object and context information at the time point when the fried egg is imaged.

Specifically, the processor 120 may obtain the intent information of the user from the trained model by using the information on the fried egg and the like which are the obtained objects and the location information (e.g., street) indicating the place where the user is present at the time point when the fried egg is imaged, as input data of the trained model.

In this case, if the intent information of the user obtained from the trained model corresponds to the food, the processor 120 may obtain the information related to the object from the knowledge base by using this.

Specifically, referring to FIG. 13, the knowledge base includes the fried egg which is the object information matching to the fried egg.

In this case, the processor 120 may determine whether there is information related to the food which is the intent of the user, among the eggs, XXX, YYY, and A which are related to the fried egg.

Specifically, referring to FIG. 13, the common intent information between the fried egg and the YYY is food, and accordingly, it includes the food corresponding to the intent information of the user, and the common intent information between the fried egg and A is food, and accordingly, it includes the food corresponding to the intent information of the user. However, since the common intent information between the eggs and the fried eggs is cooking and the common intent information between the fried egg and XXX is cooking, it is not related to the food that is predicted as the intent of the user who captured the image of the fried egg on the street.

Accordingly, the processor 120 may determine the YYY and A as the information related to the food which is the intent of the user, among the pieces of information related to the fried egg.

In addition, the processor 120 may obtain the information on the YYY and A, the description of the fried egg and YYY, and the description of the fried egg and A, as the information related to the fried egg included in the image captured by the user, and display the information related to the fried egg on a display using these.

For example, referring to FIG. 13, the description of the fried egg and the YYY corresponds to "watched on television" and the description of the fried egg and the A corresponds to "watched on television".

Figure 16C:
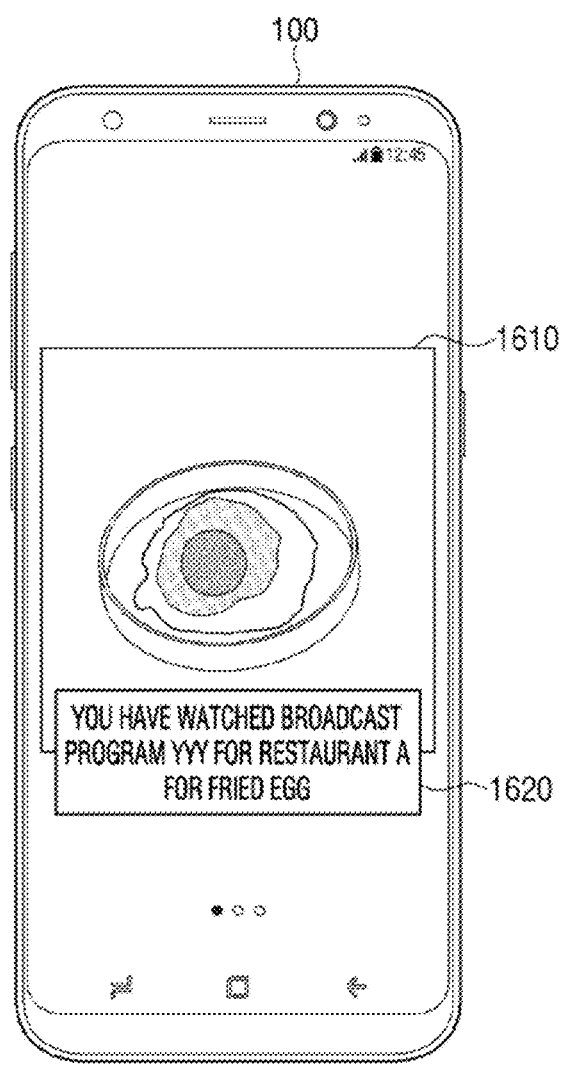

Therefore, using these pieces of information, referring to FIG. 16C, the processor 120 may display information 1620 indicating that "you have watched broadcast program YYY for the restaurant A for fried egg on television" on the display.

As described above, according to various embodiments of the disclosure, various pieces of information matching to the intent of the user may be provided.

Figure 17:
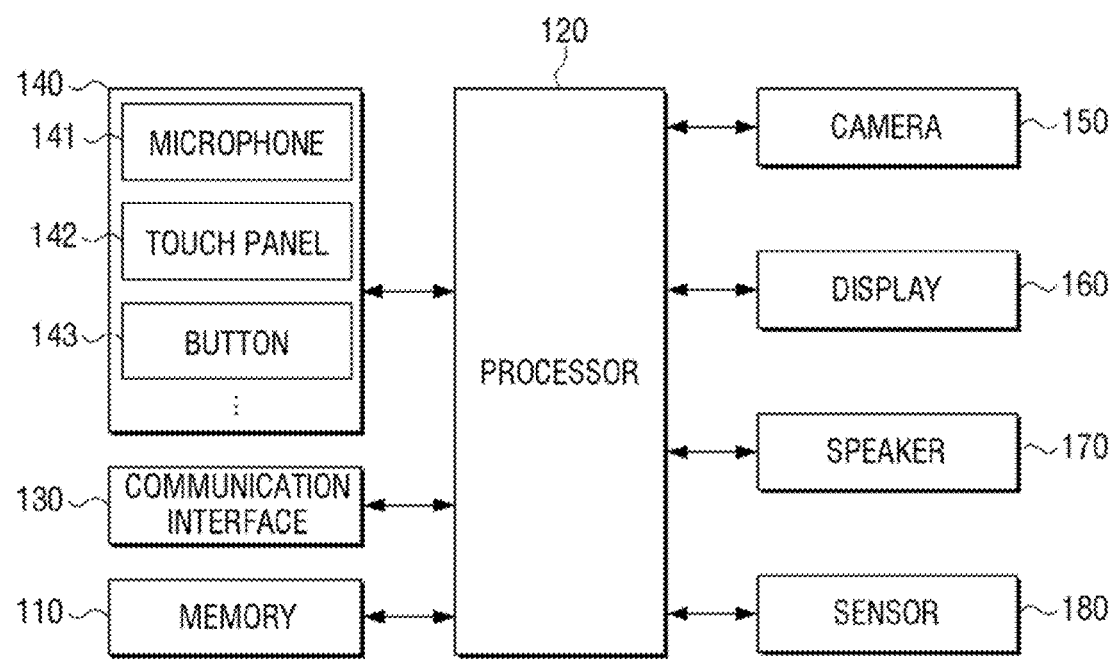
FIG. 17 is a block diagram specifically illustrating the configuration of the electronic device according to an embodiment.

FIG. 17 is a block diagram specifically illustrating the configuration of the electronic device according to an embodiment.

Referring to FIG. 17, the electronic device 100 may include the memory 110, the processor 120, a communication interface 130, an input interface 140, a camera 150, a display 160, a speaker 170, and a sensor 180. Meanwhile, the constituent elements illustrated in FIG. 17 may be controlled by the processor 120. Meanwhile, the memory 110 and the processor 120 illustrated in FIG. 17 have been described with reference to FIG. 2, and therefore the overlapped description will not be repeated.

The communication interface 130 may include circuitry and communicate with external devices. For example, the communication interface 130 may communicate with an external server and external electronic devices (e.g., a plurality of electronic devices configuring the environment of IoT). Meanwhile, the communication connection of the communication interface 130 with the external devices may include communication via a third device (e.g., a repeater, a hub, an access point, a server, a gateway, or the like). The wireless communication may include cellular communication using at least one of LTE, LTE Advanced (LTE-A), code division multiple access (CDMA), wideband CDMA (WCDMA), universal mobile telecommunications system (UMTS), Wireless Broadband (WiBro), or global system for mobile communications (GSM). According to an embodiment, the wireless communication may include, for example, at least one of wireless fidelity (Wi-Fi), Bluetooth, Bluetooth Low Energy (BLE), Zigbee, near field communication (NFC), magnetic secure transmission, radio frequency (RF), or body area network (BAN). The wired communication may include, for example, at least one of universal serial bus (USB), high definition multimedia interface (HDMI), recommended standard 232 (RS-232), power line communication, or plain old telephone service (POTS). The network for the wireless communication and the wired communication may include at least one of a telecommunication network, for example, a computer network (e.g., LAN or WAN), the Internet, or a telephone network.

In this case, the communication interface 130 may communicate with external devices to transmit and receive various pieces of data.

For example, the communication interface 120 may communicate with the external server, transmit the device information and the object information to the server, and receive characteristics information on the device information and the object information from the serer. In another example, the communication interface 120 may communicate with a plurality of electronic devices, transmit information included in the knowledge base to the plurality of electronic devices, and receive the information included in the knowledge base from the plurality of electronic devices.

The input interface 140 may receive a user command for controlling the electronic device 100. For example, the input interface 110 may receive various user manipulations such as a user touch, a user voice, and the like of the user for controlling the electronic device 100.

For this, the input interface 110 may include, referring to FIG. 17, a microphone 141 for receiving a user voice, a touch panel 142 for receiving a user touch using user's hands or a stylus pen, a button 143 for receiving a user manipulation, and the like. However, the example of the input interface 140 illustrated in FIG. 17 is merely an embodiment, and the input interface 140 may be implemented as another input device (e.g., keyboard, mouse, motion inputter, and the like).

The camera 150 may capture an image of a subject to generate an image. For example, the camera 150 may image the inside or the outside of the electronic device 100 according to the control of the processor 140.

The display 160 may display various screens. For example, the display 150 may display an image obtained through the camera 150 or the like according to the control of the processor 140.

In addition, the display 150 may display various pieces of information. In particular, the display 150 may display information related to the object according to the control of the processor 140.

In this case, the display 150 may be implemented as a touch screen with the touch panel 142.

The speaker 170 is an element for outputting not only various pieces of audio data, but also various alerts or voice messages. In particular, the speaker 170 may output the information related to the object according to the control of the processor 140 as a voice message in a form of natural language. Meanwhile, the element for outputting the sound may be implemented as the speaker 170, but this is merely an embodiment, and the element may be implemented as an output terminal capable of outputting audio data.

The sensor 180 may detect various pieces of state information of the electronic device 100. For example, the sensor 180 may include a movement sensor for detecting movement information of the electronic device 100 (e.g., gyro sensor, acceleration sensor, or the like), and may include a sensor for detecting position information (e.g., global positioning system (GPS) sensor), a sensor for detecting environment information around the electronic device 100 (e.g., temperature sensor, humidity sensor, atmospheric pressure sensor, or the like), a sensor for detecting user information of the electronic device 100 (e.g., blood pressure sensor, blood sugar sensor, a pulse sensor, or the like), and the like.

Figure 18:
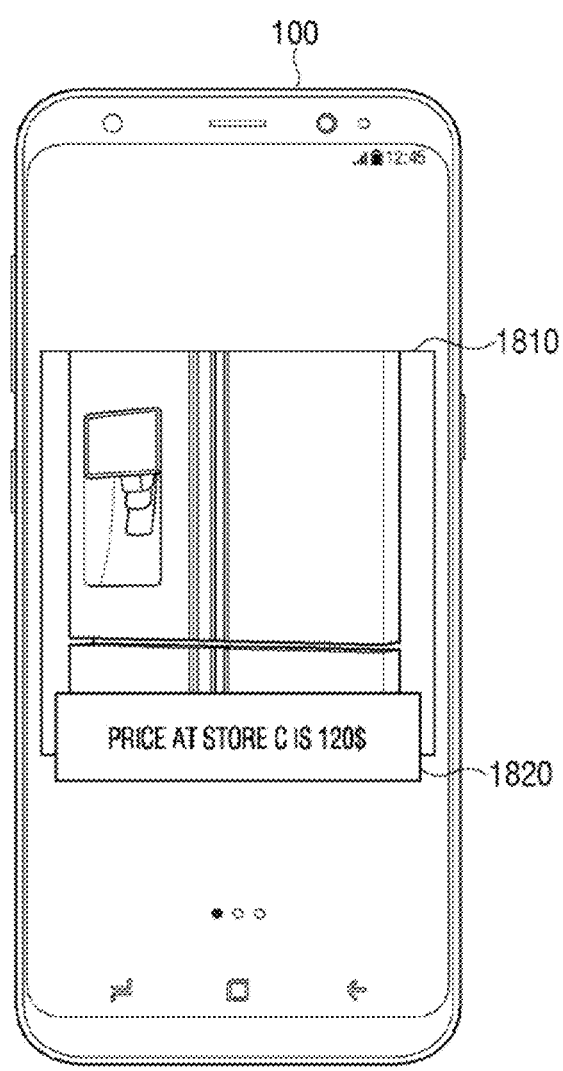
FIG. 18 is a diagram illustrating a method for providing information related to an object according to an embodiment.
Figure 19:
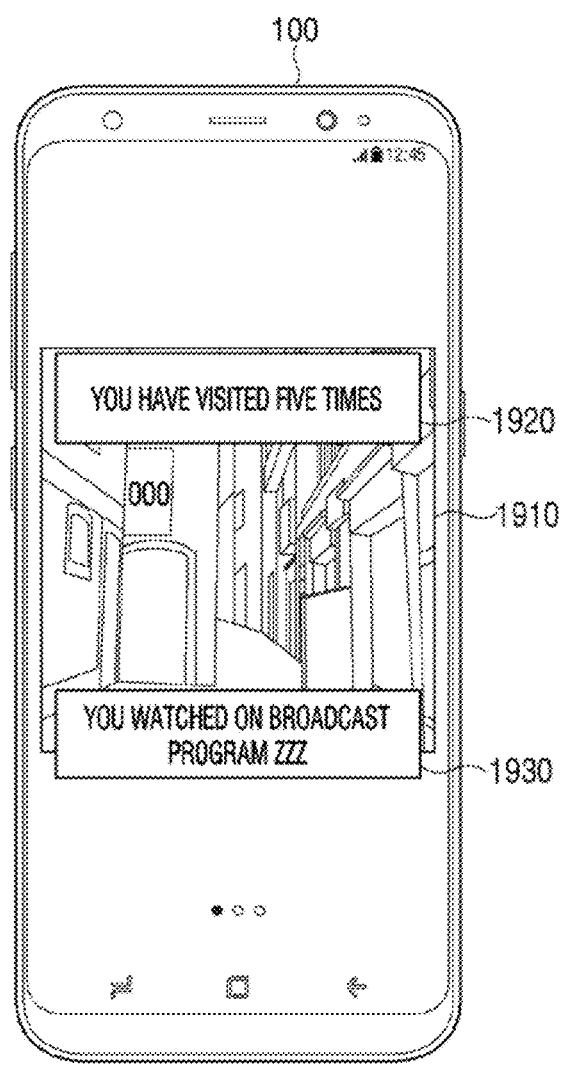
FIG. 19 is a diagram illustrating a method for providing information related to an object according to an embodiment.

FIGS. 18 and 19 are diagrams illustrating a method for providing information related to an object according to an embodiment.

For example, referring to FIG. 18, if the user in a store B images a refrigerator displayed in the store through the electronic device 100, a captured image 1810 may be displayed on the display. In this case, the electronic device 100 may detect the refrigerator from the image. In addition, the electronic device 100 may display information 1820 indicating that "the price in store C is 100$" on the display by using information obtained regarding the refrigerator from the knowledge base.

In another example, referring to FIG. 19, if the user images a street with various store signs through the electronic device 100, a captured image 1910 may be displayed on the display. In this case, the electronic device 100 may detect name of the stores included in the signs from the image. In addition, the electronic device 100 may display information 1920 indicating "you have visited five times" using information obtained regarding a store name A, and display information 1930 indicating "you watched on broadcast program ZZZ" on the display using information obtained regarding a store name B, from the knowledge base.

Figure 20:
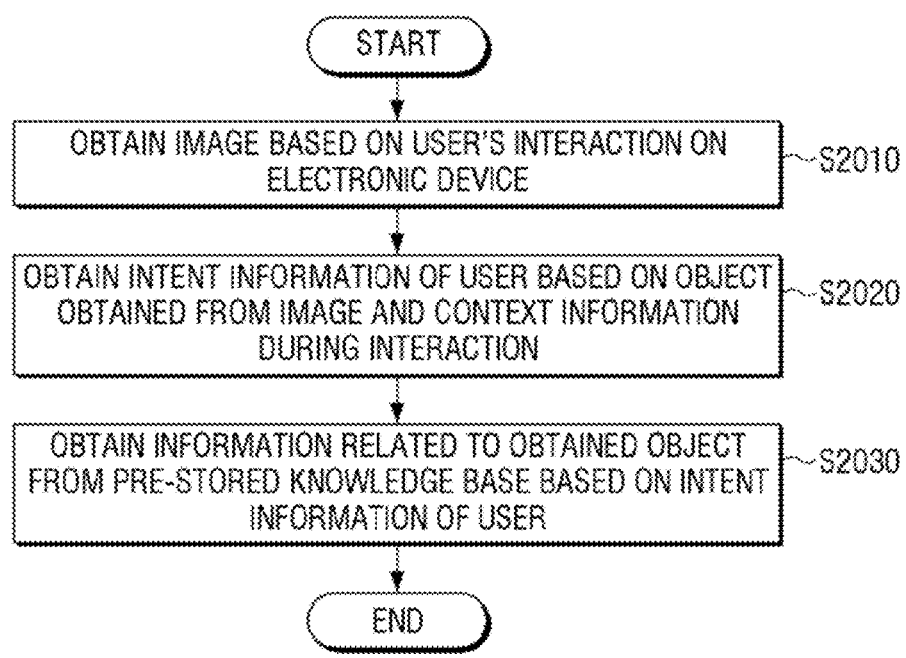
FIG. 20 is a flowchart illustrating a method for controlling the electronic device according to an embodiment.

FIG. 20 is a flowchart illustrating a method for controlling the electronic device according to an embodiment.

First, an image is obtained based on a user's interaction on the electronic device (S2010). In this case, in the step S2010, the image may be obtained through the camera of the electronic device based on the user's interaction.

Then, intent information of the user is obtained based on an object obtained from the image and context information during the interaction (S2020).

In addition, information related to the obtained object is obtained from pre-stored knowledge base based on the intent information of the user (S2030).

The knowledge base herein may include device information on the plurality of electronic devices on which user's activities are performed, object information on a plurality of objects based on the activities, and intent information corresponding to the information related to each other, and in this case, in the step S2030, the information related to the obtained object may be obtained based on the intent information corresponding to the obtained object from the knowledge base.

Meanwhile, the knowledge base may include data in which device information on a plurality of electronic devices on which user's activities are performed, object information on a plurality of objects obtained based on the activities, and an edge representing a relationship between pieces of information related to each other among the device information and the object information are stored as a graph, and the edge herein may include intent information corresponding to the pieces of information related to each other.

Meanwhile, if the user's activity is performed on the electronic device, the intent information corresponding to the device information on the electronic device on which the activity is performed and the object information on at least one object obtained based on the user's activity is obtained, the common intent information is determined among the intent information corresponding to the device information and the object information, and a knowledge base may be generated based on the device information, the object information, and the common intent information. In this case, an edge representing a relationship between the device information and the object information and an edge representing a relationship between the pieces of object information may include the common intent information.

In addition, the knowledge base may be updated based on information newly obtained based on the user's activity on the electronic device.

If the information newly obtained based on the user's activity performed on the plurality of electronic devices is received, the knowledge base may be updated based on the received information.

The information included in the knowledge base may be transmitted to the plurality of electronic devices.

In the step S2030, information corresponding to the object obtained in the knowledge base may be determined, and information having a relationship corresponding to the intent information of the user among the information related to the determined information may be obtained from the knowledge base as the information related to the obtained object.

The information related to the obtained object may be displayed.

The specific method for providing the information related to the object using the knowledge base has been described above.

In this disclosure, the term "unit" or "module" may include a unit implemented with hardware, software, or firmware and may be interchangeably used with terms, for example, logic, logic blocks, parts, or circuits. The "unit" or the "module" may be a part integrally formed or a minimum unit or a part of the part performing one or more functions. For example, the module may be implemented as an application-specific integrated circuit (ASIC).

Various embodiments of the disclosure may be implemented as software including instructions stored in machine (e.g., computer)-readable storage media. The machine is a device which invokes instructions stored in the storage medium and is operated according to the invoked instructions, and may include an electronic device (e.g., electronic device 100) according to the disclosed embodiments. In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium.

According to an embodiment, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

What is claimed is:

1. An electronic device comprising:
a camera;
a memory comprising at least one instruction; and
a processor configured to be connected to the memory to control the electronic device,
wherein the processor, by executing the at least one instruction, is configured to:
obtain an image based on an interaction of a user on the electronic device through the camera and analyze the image to acquire information of an object in the image by using an artificial intelligence algorithm;
obtain intent information of the user based on the acquired information of the object and context information during the interaction; and
obtain information related to the object from a knowledge base stored in the memory based on the intent information of the user and provide the information related to the object to the user,
wherein the memory stores a device mapping table in which pieces of first intent information are mapped to a plurality of electronic devices, and an object mapping table in which pieces of second intent information are mapped to a plurality of objects,
wherein the processor is further configured to:
based on a first activity of the user being performed on a first electronic device among the plurality of electronic devices, obtain at least one piece of first intent information corresponding to the first electronic device among the pieces of first intent information from the device mapping table, and obtain at least one piece of second intent information corresponding to a first object of the plurality of objects among the pieces of second intent information from the object mapping table,
determine common intent information among the at least one piece of first intent information corresponding to the first electronic device and the at least one piece of second intent information corresponding to the first object, and
generate the knowledge base based on device information on the first electronic device, object information on the first object, and the determined common intent information,
wherein the knowledge base comprises a plurality of pieces of device information on the plurality of electronic devices on which activities of the user are performed, a plurality of pieces of object information on the plurality of objects obtained based on the activities, and a plurality of pieces of intent information corresponding to the plurality of electronic devices and the plurality of objects, wherein the plurality of pieces of intent information comprise first common intent information between the first electronic device of the plurality of electronic devices and the first object of the plurality of objects, and second common intent information between the first object of the plurality of objects and a second object of the plurality of objects, wherein the processor is further configured to obtain the information related to the object based on at least one of the first common intent information and the second common intent information from the knowledge base, wherein the processor is further configured to:
based on a second activity of the user being performed on a second electronic device different from the first electronic device among the plurality of electronic devices, newly obtain information including third common intent information between the second electronic device and the first object based on the device mapping table and the object mapping table, and
update the knowledge base based on the newly obtained information.

2. The electronic device according to claim 1, wherein the knowledge base comprises data in which the device information on the first electronic device of the plurality of electronic devices, the object information on the first object of the plurality of objects, and an edge representing a relationship between the device information on the first electronic device and the object information on the first object are stored as a graph, and
wherein the edge comprises the first common intent information between the first electronic device and the first object.

3. The electronic device according to claim 1, wherein the knowledge base further comprises an edge representing a relationship between the device information on the first electronic device and the object information on the first object and comprising the determined common intent information.

4. The electronic device according to claim 1, further comprising:
a communication interface comprising circuitry,
wherein the processor is further configured to, based on pieces of information newly obtained based on the activities performed on the plurality of electronic devices being received via the communication interface, update the knowledge base based on the newly obtained pieces of information.

5. The electronic device according to claim 1, further comprising:
a communication interface comprising circuitry,
wherein the processor is further configured to transmit information included in the knowledge base to the plurality of electronic devices via the communication interface.

6. The electronic device according to claim 1, wherein the processor is further configured to:
determine information corresponding to the object from the knowledge base; and
obtain information having a relationship corresponding to the intent information of the user among information related to the determined information from the knowledge base as the information related to the object.

7. The electronic device according to claim 1, further comprising:

a display,
wherein the processor is further configured to display the information related to the object on the display.

8. The electronic device according to claim 1, wherein the knowledge base further comprises a first description of a relationship between the first electronic device and the first object, and a second description of a relationship between the first object and the second object, and
wherein the processor is further configured to obtain the information related to the object based on the first common intent information, the second common intent information, the first description and the second description.

9. A method for controlling an electronic device, the method comprising:
obtaining an image based on an interaction of a user on the electronic device through a camera of the electronic device and analyzing the image to acquire information of an object in the image by using an artificial intelligence algorithm;
obtaining intent information of the user based on the acquired information of the object and context information during the interaction; and
obtaining information related to the object from a knowledge base stored in a memory of the electronic device based on the intent information of the user and providing the information related to the object to the user,
wherein the memory stores a device mapping table in which pieces of first intent information are mapped to a plurality of electronic devices, and an object mapping table in which pieces of second intent information are mapped to a plurality of objects,
wherein the method further comprises:
based on a first activity of the user being performed on a first electronic device among the plurality of electronic devices, obtaining at least one piece of first intent information corresponding to the first electronic device among the pieces of first intent information from the device mapping table, and obtaining at least one piece of second intent information corresponding to a first object of the plurality of objects among the pieces of second intent information from the object mapping table,
determining common intent information among the at least one piece of first intent information corresponding to the first electronic device and the at least one piece of second intent information corresponding to the first object, and
generating the knowledge base based on device information on the first electronic device, object information on the first object, and the determined common intent information,
wherein the knowledge base comprises a plurality of pieces of device information on the plurality of electronic devices on which activities of the user are performed, a plurality of pieces of object information on the plurality of objects obtained based on the activities, and a plurality of pieces of intent information corresponding to the plurality of electronic devices and the plurality of objects,
wherein the plurality of pieces of intent information comprise first common intent information between the first electronic device of the plurality of electronic devices and the first object of the plurality of objects, and second common intent information between the first object of the plurality of objects and a second object of the plurality of objects, and wherein the obtaining the information related to the object comprises obtaining the information related to the object based on at least one of the first common intent information and the second common intent information from the knowledge base, wherein the method further comprises:

based on a second activity of the user being performed on a second electronic device different from the first electronic device among the plurality of electronic devices, newly obtaining information including third common intent information between the second electronic device and the first object based on the device mapping table and the object mapping table, and updating the knowledge base based on the newly obtained information.

10. The method according to claim 9, wherein the knowledge base comprises data in which the device information on the first electronic device of the plurality of electronic devices, the object information on the first object of the plurality of objects, and an edge representing a relationship between the device information on the first electronic device of the plurality of electronic devices and the object information on the first object of the plurality of objects are stored as a graph, and wherein the edge comprises the first common intent information between the first electronic device and the first object.

11. The method according to claim 9, wherein the knowledge base further comprises an edge representing a relationship between the device information on the first electronic device and the object information on the first object of the plurality of objects and comprising the determined common intent information.

12. The method according to claim 9, further comprising:

based on pieces of information newly obtained based on the activities of the user performed on the plurality of electronic devices being received, updating the knowledge base based on the newly obtained pieces of information.

13. The method according to claim 9, further comprising:

transmitting information included in the knowledge base to the plurality of electronic devices.

14. The method according to claim 9, wherein the knowledge base further comprises a first description of a relationship between the first electronic device and the first object, and a second description of a relationship between the first object and the second object, and wherein the obtaining the information related to the object comprises obtaining the information related to the object based on the first common intent information, the second common intent information, the first description and the second description.

* * * * *